(12) United States Patent
Sun et al.

(10) Patent No.: US 12,225,517 B2
(45) Date of Patent: *Feb. 11, 2025

(54) DATA AND CONTROL CHANNELS IN SYNCHRONIZATION BURSTS FOR MILLIMETER WAVE NEW RADIO

(71) Applicant: QUALCOMM Incorporated, San Diego, CA (US)

(72) Inventors: Jing Sun, San Diego, CA (US); Tao Luo, San Diego, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 18/532,096

(22) Filed: Dec. 7, 2023

(65) Prior Publication Data

US 2024/0205904 A1 Jun. 20, 2024

Related U.S. Application Data

(63) Continuation of application No. 17/404,844, filed on Aug. 17, 2021, now Pat. No. 11,889,490, which is a
(Continued)

(51) Int. Cl.
*H04W 72/044* (2023.01)
*H01Q 1/24* (2006.01)
(Continued)

(52) U.S. Cl.
CPC ............ *H04W 72/046* (2013.01); *H04B 7/04* (2013.01); *H04W 56/0015* (2013.01);
(Continued)

(58) Field of Classification Search
CPC ............ H04W 56/001; H04W 16/28; H04W 56/0015; H04W 72/046; H04W 56/0095;
(Continued)

(56) References Cited

U.S. PATENT DOCUMENTS 11,115,983 B2    9/2021    Sun et al.
2007/0168841 A1    7/2007    Lakkis
(Continued)

FOREIGN PATENT DOCUMENTS

CN    101861718 A    10/2010
CN    104885377 A    9/2015
(Continued)

OTHER PUBLICATIONS

Arana J.M.P., et al., "Random Access Technique for Millimeter-Wave Cellular Communications", 2016 International Conference on Information and Communication Technology Convergence (ICTC), Dec. 2016, pp. 997-999.
(Continued)

*Primary Examiner* — Margaret G Mastrodonato

(57) ABSTRACT

Techniques are described for millimeter wave wireless communication. One method includes configuring a synchronization slot associated with a plurality of synchronization blocks, configuring a transmission of each synchronization block of the plurality of synchronization blocks based on the configured synchronization slot, assigning a synchronization region to a first frequency portion associated with a transmission beam of each synchronization block, assigning at least one of a data region or a control region to a second frequency portion associated with the transmission beam of each synchronization block, and transmitting a synchronization signal during the synchronization region and transmitting at least one of data signal during the data region or control information during the control region to a wireless node.

20 Claims, 18 Drawing Sheets

Related U.S. Application Data continuation of application No. 15/673,350, filed on Aug. 9, 2017, now Pat. No. 11,115,983.

(60) Provisional application No. 62/421,127, filed on Nov. 11, 2016.

(51) Int. Cl.
  H01Q 21/20 (2006.01)
  H04B 7/04 (2017.01)
  H04B 7/26 (2006.01)
  H04W 16/28 (2009.01)
  H04W 56/00 (2009.01)
  H04W 72/542 (2023.01)

(52) U.S. Cl.
  CPC .......... *H04W 72/542* (2023.01); *H01Q 1/246* (2013.01); *H01Q 21/205* (2013.01); *H04B 7/2656* (2013.01); *H04W 16/28* (2013.01); *H04W 56/0095* (2013.01)

(58) Field of Classification Search
  CPC ............. H04W 72/1231; H04B 7/0408; H04B 7/0617; H04B 7/04; H04B 7/2656
  See application file for complete search history.

(56) References Cited

U.S. PATENT DOCUMENTS

| | | |
|---|---|---|
| 2010/0254293 A1 | 10/2010 | Son et al. |
| 2013/0195043 A1 | 8/2013 | Chen et al. |
| 2013/0235851 A1 | 9/2013 | Abu-Surra et al. |
| 2013/0301619 A1 | 11/2013 | Singh et al. |
| 2014/0148107 A1 | 5/2014 | Maltsev et al. |
| 2014/0161105 A1 | 6/2014 | Cordeiro et al. |
| 2014/0177588 A1 | 6/2014 | Chun et al. |
| 2014/0254515 A1 | 9/2014 | Kim et al. |
| 2014/0321375 A1 | 10/2014 | Agiwal et al. |
| 2014/0341310 A1 | 11/2014 | Rahman et al. |
| 2015/0004918 A1 | 1/2015 | Wang et al. |
| 2015/0009968 A1 | 1/2015 | Yu et al. |
| 2015/0124738 A1 | 5/2015 | Ramakrishna et al. |
| 2015/0173004 A1 | 6/2015 | Nigam et al. |
| 2015/0215866 A1 | 7/2015 | Kojima et al. |
| 2015/0358931 A1 | 12/2015 | Koorapaty et al. |
| 2016/0057717 A1 | 2/2016 | Liberg et al. |
| 2016/0087704 A1 | 3/2016 | Guey et al. |
| 2016/0100373 A1 | 4/2016 | Chen |
| 2016/0269983 A1 | 9/2016 | Islam et al. |
| 2016/0277225 A1 | 9/2016 | Frenne et al. |
| 2016/0323757 A1 | 11/2016 | Braun et al. |
| 2016/0360463 A1 | 12/2016 | Kim |
| 2017/0295502 A1 | 10/2017 | Stirling-Gallacher et al. |
| 2018/0139742 A1 | 5/2018 | Sun et al. |
| 2019/0261296 A1 | 8/2019 | Li et al. |
| 2021/0377932 A1 | 12/2021 | Sun et al. |

FOREIGN PATENT DOCUMENTS

| | | |
|---|---|---|
| CN | 105723639 A | 6/2016 |
| EP | 3471469 A1 | 4/2019 |
| EP | 3525362 A1 | 8/2019 |
| EP | 3539232 A1 | 9/2019 |
| EP | 3589036 A1 | 1/2020 |
| EP | 3668212 A1 | 6/2020 |
| EP | 3537784 B1 | 3/2021 |
| WO | WO-2016045623 A2 | 3/2016 |
| WO | WO-2016113177 A1 | 7/2016 |
| WO | WO-2017018966 A1 | 2/2017 |
| WO | WO-2017164593 A1 | 9/2017 |
| WO | WO-2018175714 A1 | 9/2018 |
| WO | WO-2018217063 A1 | 11/2018 |
| WO | WO-2018228519 A1 | 12/2018 |
| WO | WO-2018231553 A2 | 12/2018 |
| WO | WO-2018232308 A1 | 12/2018 |
| WO | WO-2019022572 A1 | 1/2019 |

OTHER PUBLICATIONS

European Search Report—EP20195692—Search Authority—The Hague—Nov. 16, 2020.

European Search Report—EP23153291—Search Authority—The Hague—Apr. 18, 2023.

Huawei, et al., "WF on SS Burst Set Composition and SS—Block Index Indication", 3GPP TSG RAN WG1 Meeting #88, Draft; R1-1703832, WF on SS Burst Set Composition and SS—Block Index Indication_V4, 3rd Generation Partnership Project (3GPP), Mobile Competence Centre, 650, Route Des Lucioles, F-06921 Sophia-Antipolis, vol. RAN WG1. No. Athens, Greece, Jan. 13, 2017-Jan. 17, 2017, Feb. 16, 2017 (Feb. 16, 2017), XP051236632, 7 Pages.

Intel Corporation: "On Multiplexing between PSS and SSS", 3GPP TSG RAN WG1 Meeting #87, R1-1611964, 3rd Generation Partnership Project (3GPP), Mobile Competence Centre, 650, Route Des Lucioles, F-06921 Sophia-Antipolis Cedex, France, vol. RAN WG1, No. Reno, USA, Nov. 14, 2016-Nov. 18, 2016, 4 Pages, Nov. 6, 2016 (Nov. 6, 2016), XP051190776, Section 2.

Interdigital Communications: "Views on Beamforming with a Large Number of Antennas", 3GPP Draft, 3GPP TSG-RAN WG1 Meeting #85, R1-165062, Nanjing, China May 23-27, 2016, May 27, 2016, pp. 1-6.

International Preliminary Report on Patentability—PCT/US2017/059849, The International Bureau of WIPO—Geneva, Switzerland, May 23, 2019.

International Search Report and Written Opinion—PCT/US2017/059849—ISA/EPO—Jan. 29, 2018.

Jeong C., et al., "Random Access in Millimeter-Wave Beamforming Cellular Networks: Issues and Approaches", Millimeter-Wave Communications for 5G IEEE Communications Magazine, IEEE Service Center, Piscataway, US, vol. 53, No. 1, Jan. 1, 2015, pp. 180-185, XP011570628, ISSN: 0163-6804, DOI: 10.1109/MCOM.2015.7010532 [retrieved on Jan. 14, 2015].

Khan M.S., et al., "Cell Selection Technique for 5G Millimeter-Wave Cellular Systems", 2017 International Conference on Information and Communication Technology Convergence (ICTC), Oct. 2017, pp. 734-736.

Panasonic: "Clarification on D2D Synchronization Procedure", R1-135398, 3GPP TSG RAN WG1 Meeting #75, San Francisco, USA, Nov. 11-15, 2013, 5 Pages.

Asustek: "Impact of Multiplexing Multiple Numerologies on Initial Access", 3GPP TSG RAN WG1 Meeting #86bis, R1-1610204, Lisbon, Portugal Oct. 10-14, 2016, 3 Pages.

Catt: "Multiplexing of Broadcast Channel and Synchronization Channels", 3GPP TSG RAN WG1 Meeting #87, R1-1611372, Reno, NV, USA, Nov. 14-18, 2016, pp. 1-3.

Catt: "NR Multi-Stage Synchronization Channel Design", 3GPP TSG RAN WG1 #86bis, R1-1608785, Lisbon, Portugal, Oct. 10-14, 2016, pp. 1-3.

Catt: "NR Numerology Agnostic Synchronization Channel Design", 3GPP TSG RAN WG1 #86bis, R1-1608783, Lisbon, Portugal, Oct. 10-14, 2016, pp. 1-3.

Catt: "NR System Bandwidth Agnostic Synchronization Channel Design", R1-1608784, 3GPP TSG RAN WG1 #86bis, Lisbon, Portugal, Oct. 10-14, 2016, Agenda Item 8.1.5.1, pp. 1-4.

Catt: "QCL Assumption of NR Synchronization Signals and DM RS of Broadcast Channel Multi-Stage Synchronization Channel Design", 3GPP TSG RAN WG1 #86bis, R1-1608785, Lisbon, Portugal, Oct. 10-14, 2016, 3 Pages.

CMCC: "Beam Sweeping Using Multi-width Beams", 3GPP TSG RAN WG1 #86bis, R1-1609308, Lisbon, Portugal Oct. 10-14, 2016, 5 Pages.

Convida Wireless: "Synchronization Signal Burst Design for Initial Access", 3GPP TSG RAN WG1 Meeting #87, R1-1613007, Agenda Item: 7.1.2.1, Reno, USA, Nov. 14-18, 2016, 3 Pages.

(56) References Cited

OTHER PUBLICATIONS

Convida Wireless: "Discussion on Sync Signal Design for NR", 3GPP TSG RAN WG1 Meeting #86bis, R1-1610371, Lisbon, Portugal Oct. 10-14, 2016, 4 Pages.

Convida Wireless: "Synchronization on Beamforming Initial Access Operations", 3GPP TSG RAN WG1 Meeting #86bis, R1-1610372, Lisbon, Portugal Oct. 10-14, 2016, 3 Pages.

COOLPAD: "Discussion on the Design for Synchronization Signal", 3GPP TSG RAN WG1 Meeting #87, 3GPP Draft, R1-1612755_ Discussion on the Design for Synchronization Signal, 3rd Generation Partnership Project (3GPP), Mobile Competence Centre, 650, Route Des Lucioles, F-06921 Sophia-Antipolis Cedex, France, vol. RAN WG1, No. Reno, USA, Nov. 14, 2016-Nov. 18, 2016, 3 Pages, Nov. 4, 2016 (Nov. 4, 2016), XP051189452, sec.2, p. 2, figure 1.

Ericsson: "NR Synchronization Signals for Idle and Connected Mode Mobility", 3GPP Draft, 3GPP TSG-RAN WG1 Meeting #86bis, R1-1609668, Lisbon, Portugal, Oct. 10-14, 2016, pp. 1-5, Figure 1 and pp. 1 to 2.

Ericsson: "Overview of Synchronization Signal Design for NR Initial Access", 3GPP TSG-RAN WG1 Meeting #86bis, R1-1609669, Lisbon, Portugal, Oct. 10-14, 2016, pp. 1-3.

Ericsson: "System Information Acquisition Principle for NR", 3GPP TSG-RAN WG1 Meeting #86bis, R1-1610354, Lisbon, Portugal, Oct. 10-14, 2016, pp. 1-2.

ETRI: "Design of Synchronization Signal for Supporting Different Numerologies in NR", 3GPP TSG RAN WG1 Meeting #86bis, R1-1609394, Lisbon, Portugal, Oct. 10-14, 2016, pp. 1-8.

ETRI: "Design of Synchronization Signal and Broadcast Channel", 3GPP TSG RAN WG1 Meeting #87, R1-1612217, Reno, USA Nov. 14-18, 2016, pp. 1-5, Nov. 5, 2016.

Fujitsu: "Discussion on Initial Access in NR", 3GPP TSG RAN WG1 Meeting #86bis, R1-1608812, Lisbon, Portugal Oct. 10-14, 2016, pp. 1-6.

Guangdong Oppo Mobile Telecom: "Discussion on Multi-Beam Based Initial Access for NR", R1-1611701, 3GPP TSG RAN WG1 Meeting #87, Reno, USA, Nov. 14-18, 2016, 3 Pages, sections 1-3.

Huawei et al., "Channel Raster and Synchronization Signal Locations", 3GPP TSG RAN WG1 Meeting #86bis, R1-1608847, 3rd Generation Partnership Project, Mobile Competence Centre, 650, Route Des Lucioles, F-06921 Sophia-Antipolis Cedex, France, vol. RAN WG1, No. Lisbon, Portugal, Oct. 10, 2016-Oct. 14, 2016, 3 Pages, Oct. 9, 2016, XP051148901, Oct. 1, 2016, Part 2, section 2.1, p. 1-p. 3.

Huawei., et al., "Design of Broadcast Signal/Channel", 3GPP TSR RAN WG1 Meeting #87, R1-1611695, Reno, USA, Nov. 14-18, 2016, 3 Pages.

Huawei., et al., "Initial Evaluation Results for Initial Access", 3GPP TSG RAN WG1 Meeting #86bis, R1-1609438, Lisbon, Portugal, Oct. 10-14, 2016, 8 Pages.

Huawei, et al., "Support of Multiple Numerologies in Synchronization Signal Design" [online], 3GPP Draft, 3GPP TSG-RAN WG1#86bis, R1-1609436, Oct. 1, 2016, 6 Pages, Retrieved from the Internet URL: http://www.3gpp.org/ftp/tsg_ran/WG1_RL1/TSGR1_86b/Docs/R1-1609436.zip.

Huawei., et al., "Unified Single/Multiple Beam-Based Initial Access Procedure in NR ", 3GPP TSG RAN WG1 Meeting #86bis, R1-1608823, Lisbon, Portugal, Oct. 10-14, 2016, pp. 1-6.

Huawei., et al., "WF on Synchronization Signal for NR Initial Access", 3GPP TSG RAN WG1 Meeting #86bis, R1-16xxxxx, Lisbon, Portugal, Oct. 11-14, 2016, 3 Pages.

Huawei, et al., "Synchronization Signal Design in NR", 3GPP TSG RAN WG1 Meeting #86bis, 3GPP Draft, R1-1608846, 3GPP TSG RAN WG1 Meeting #86bis, 3rd Generation Partnership Project (3GPP), Mobile Competence Centre, 650, Route Des Lucioles, F-06921 Sophia-Antipolis Cedex, France, vol. RAN WG1, No. Lisbon, Portugal, Oct. 10, 2016-Oct. 14, 2016, pp. 1-5, Oct. 9, 2016 (Oct. 9, 2016), XP051148900, p. 2, paragraph 8, table 1.

Institute for Information Industry (III): "Discussion on System Information Delivery in NR", 3GPP Draft, R1-1610207, Discussion on System Information Delivery in NR, 3rd Generation Partnership Project (3GPP), Mobile Competence Centre, 650, Route Des Lucioles, F-06921 Sophia-Antipolis Cedex, France, vol. RAN WG1, No. Lisbon, Portugal, Oct. 10, 2016-Oct. 14, 2016, Oct. 9, 2016 (Oct. 9, 2016), XP051150226, 5 pages, the whole document.

Intel Corporation: "Considerations for Synchronization Signal Design", 3GPP TSG RAN WG1 Meeting #87, R1-1611963, Reno, Nevada, U.S.A., Nov. 14-18, 2016, pp. 1-5.

Intel Corporation., et al., "WF on the Unified Structure of DL Sync Signal", 3GPP TSG RAN WG1 Meeting #86b, R1-1610522, Lisbon, Portugal Oct. 10-14, 2016, 4 Pages.

Intel Corporation: "On NR DL Synchronization", R1-1610400, 3GPP TSG RAN WG1 Meeting #86bis, Lisbon, Portugal, Oct. 10-14, 2016, Agenda Item 8.1.5.1, pp. 1-8.

Intel Corporation: "Preliminary Performance Evaluation of Different Beamforming Options for NR Synchronization Signals", 3GPP TSG RAN WG1 Meeting #86bis, R1-1610378, Lisbon, Portugal, Oct. 10-14, 2016, pp. 1-5.

Interdigital Communications: "A Framework for Initial Access for NR", R1-1610351, 3GPP TSG-RAN WG1 #86bis, Lisbon, Portugal, Oct. 10-14, 2016, Agenda Item 8.1.5.1, pp. 1-4.

Interdigital Communications: "Considerations for DL Broadcast Channel", 3GPP TSG RAN WG1 Meeting #86bis, R1-1610356, Lisbon, Portugal Oct. 10-14, 2016, pp. 1-4.

Interdigital Communications: "Considerations for Initial Synchronization in NR", 3GPP Draft, 3GPP TSG RAN WG1 Meeting #86bis, R1-1609920, Considerations Initial Synchronization in NR, 3rd Generation Partnership Project (3GPP), Mobile Competence Centre, 650, Route Des Lucioles, F-06921, Sophia-Antipolis Cedex, France, vol. RAN WG1. No. Lisbon. Portugal, Oct. 10, 2016-Oct. 14, 2016, Oct. 9, 2016 (Oct. 9, 2016), XP051149946, 10 pages, Section 2, p. 1-p. 2; figure 2.

Interdigital Communications., et al., "Considerations for DL Broadcast Channel for Initial Access in NR", 3GPP TSG RAN WG1 Meeting #87, R1-1612628, Reno, USA Nov. 14-18, 2016, 5 Pages.

KT Corp: "Initial Timing and Beam Acquisition for Multi-Beam Based Approach", 3GPP TSG RAN WG1 Meeting #86bis, R1-1609314, Lisbon, Portugal, Oct. 10-14, 2016, 3 Pages.

KT Corp: "Structure of DL Sync Signal for Multi-Beam Based Approaches", 3GPP TSG RAN WG1 Meeting #87, R1-1611862, Reno, USA, Nov. 14-18, 2016, 3 Pages.

LG Electronics: "Consideration on DL Channel for System Information Delivery", 3GPP TSG RAN WG1 Meeting #87, R1-1611788, Reno, USA Nov. 14-18, 2016, 3 Pages.

LG Electronics: "Discussion on SS Block and SS Burst", 3GPP TSG RAN WG1 Meeting #87, R1-1611786, Reno, USA, Nov. 14-18, 2016, 3 Pages.

LG Electronics: "Issues on NR Initial Access", 3GPP TSG RAN WG1 Meeting #86bis, R1-1609264, Lisbon, Portugal Oct. 10-14, 2016, 4 Pages.

LG Electronics: "NR PBCH Design", 3GPP TSG RAN WG1 Meeting #87, R1-1611787, Reno, USA Nov. 14-18, 2016, 5 Pages.

LG Electronics: "NR Synchronization Signal Design", 3GPP TSG RAN WG1 Meeting #87, R1-1611784, Reno, USA Nov. 14-18, 2016, 10 Pages.

LG Electronics: "Numerology for NR Synchronization Signal", 3GPP TSG RAN WG1 Meeting #86bis, R1-1609265, Lisbon, Portugal Oct. 10-14, 2016, 7 Pages.

Mediatek Inc: "Broadcast Channel Design for System Information Acquisition", R1-1612122, 3GPP TSG RAN WG1 Meeting #70bis, Reno, Nevada, US Nov. 14-18, 2016, Nov. 18, 2016 (Nov. 18, 2016) the Whole Document, pp. 1-6.

Mediatek Inc: "Definition of a Downlink Basic Beacon Unit in the Unified Framework for NR Initial Access", 3GPP TSG RAN WG1 Meeting #86b, R1-1609328, Lisbon, Portugal, Oct. 10-14, 2016, 3 Pages.

Mediatek Inc: "Link Level Simulation Results for NR Initial Synchronization and Cell Search (Updated)", 3GPP TSG RAN WG1 Meeting #86b, R1-1610435, Lisbon, Portugal, Oct. 10-14, 2016, 9 Pages.

Mediatek Inc: "Performance Analysis of PSS in Initial Time-Frequency Uncertainty", 3GPP TSG RAN WG1 Meeting #87, R1-1612128, Reno, USA, Nov. 14-18, 2016, 6 Pages.

(56) References Cited

OTHER PUBLICATIONS

Mitsubishi Electric: "Common Signal/Information Allocation for Initial Access and Mobility", 3GPP TSG-RAN WG1 #86bis, R1-1608711, Lisbon, Portugal, Oct. 10-14, 2016, pp. 1-7.
Motorola Mobility: "Synchronization Signal in NR", 3GPP TSG RAN WG1 Meeting #86bis, R1-1609917, Lisbon, Portugal, Oct. 10-14, 2016, pp. 1-5.
NEC: "Discussion on NR Synchronization Signal and Essential System Information Mapping", R1-1609147, 3GPP TSG RAN WG1 Meeting #86bis, Lisbon, Portugal Oct. 10-14, 2016, Agenda Item 8.1.5.1, pp. 1-2.
NEC: "Discussion on Numerology of Synchronisation Signals", 3GPP TSG RAN WG1 Meeting #86bis, R1-1609146, Lisbon, Portugal Oct. 10-14, 2016, pp. 1-2.
NEC: "Mapping of Synchronization Signals", 3GPP TSG RAN WG1 Meeting #87, R1-1611725, Reno, USA Nov. 14-18, 2016, pp. 1-2.
NEC: "Proposals for Beamformed Synchronization Signals", 3GPP TSG RAN WG1 Meeting #86bis, R1-1609152, Lisbon, Portugal Oct. 10-14, 2016, pp. 1-2.
Nokia Alcatel-Lucnt Shanghai Bell: "NR-PBCH Design," 3GPP Draft, 3GPP TSG-RAN WG1#87, R1-1612807, 3rd Generation Partnership Project (3GPP), Mobile Competence Centre, 650, Route Des Lucioles, F-06921 Sophia-Antipolis Cedex, France, vol. RAN WG1, No. Reno, USA, Nov. 14, 2016-Nov. 18, 2016, Nov. 13, 2016, XP051176749, 8 pages, p. 5.
Nokia, et al., "Beam Management in Initial Access", 3GPP TSG-RAN WG1 #86bis, 3GPP Draft; R1-1610288, 3rd Generation Partnership Project (3GPP), Mobile Competence Centre, 650, Route Des Lucioles, F-06921, Sophia-Antipolis Cedex, France, vol. RAN WG1, No. Lisbon, Portugal, Oct. 10, 2016-Oct. 14, 2016, Oct. 9, 2016 (Oct. 9, 2016), 4 Pages.
Nokia., et al., "DL Signals for Mobility Measurements in NR", 3GPP TSG-RAN WG1#86bis, R1-1610292, Lisbon, Portugal, Oct. 10-14, 2016, 4 Pages.
Nokia., et al., "Downlink Discovery Signal for NR", 3GPP TSG-RAN WG1 #86 Bis, R1-1610289, Lisbon, Portugal, Oct. 10-14, 2016, 6 Pages.
Nokia., et al., "Frame Structure Support for DL and UL Sweeping Subframes", 3GPP TSG-RAN WG1 #86 Bis, R1-1610242, Lisbon, Portugal, Oct. 10-14, 2016, 4 Pages.
Nokia., et al., "Initial Synch Signal Performance Results", 3GPP TSG-RAN WG1 #86 Bis, R1-1610290, Lisbon, Portugal, Oct. 10-14, 2016, 5 Pages.
Nokia., et al., "Numerology for NR Synchronization Signals", 3GPP TSG-RAN WG1 #86bis, R1-1610286, Lisbon, Portugal, Oct. 10-14, 2016, 4 Pages.
Nokia., et al., "On the Synchronization Signal Design Principle in NR", 3GPP TSG-RAN WG1 #86bis, R1-1610287, Lisbon, Portugal, Oct. 10-14, 2016, 6 Pages.
Nokia., et al., "Open Items in Synchronization Signal Design", 3GPP TSG-RAN WG1 #86Bis, R1-1610318, Lisbon, Portugal, Oct. 10-14, 2016, 5 Pages.
Nokia., et al., "Synchronization Signal Structure", 3GPP TSG-RAN WG1#87, R1-1612803, Reno, U.S.A., Nov. 14-18, 2016, 6 Pages.
NTT Docomo Inc: "Discussion and Evaluation on NR-PSS/SSS Design", 3GPP TSG RAN WG1 Meeting #87, R1-1612721, Nov. 14-18, 2016, 3RD Generation Partnership Project (3GPP), Mobile Competence Centre, 650, Route Des Lucioles, F-06921, Sophia-Antipolis Cedex, France, vol. RAN WG1, No. Reno, USA, Nov. 13, 2016, XPO51176664, 10 Pages.
NTT Docomo, Inc: "Discussion on Initial Access Design for NR", 3GPP TSG RAN WG1 Meeting #86bis, 3GPP Draft, R1-1610073, Discussion on Initial Access Design for NR Final, 3rd Generation Partnership Project (3GPP), Mobile Competence Centre; 650, Route Des Lucioles, F-06921 Sophia-Antipolis Cedex vol. RAN WG1, No. Lisbon, Portugal; Oct. 10, 2016-Oct. 14, 2016, Oct. 9, 2016 (Oct. 9, 2016), XP051150098, 7 Pages.

NTT Docomo, Inc: "Offline Dicussion Sumary of Initial Access for NR", 3GPP TSG RAN WG1 Meeting #86bis, R1-1610844, Lisbon, Portugal Oct. 10-14, 2016, pp. 1-4.
NTT Docomo, Inc: "Offline Thursday Dicussion Summary of Initial Access for NR", 3GPP TSG RAN WG1 Meeting #86bis, R1-1611024, Lisbon, Portugal Oct. 10-14, 2016, pp. 1-3.
NTT Docomo: "WF on NR Initial Access Signals/Channels", R1-1610498, 3GPP TSG RAN WG1 #86bis, Lisbon, Portugal, Aug. 10-14, 2016, 5 Pages.
OPPO: "Discussion on Multi-beam Based Synchronization Signal and DL Broadcast Channel for NR", 3GPP TSG RAN WG1 Meeting #86bis, R1-1608906, Lisbon, Portugal, Oct. 10-14, 2016, 3 Pages.
Panasonic: "NR Synchronization Signal and DL Broadcast Signal", R1-1609701, 3GPP TSG RAN WG1 Meeting #86bis, Lisbon, Portugal Oct. 10-14, 2016, pp. 1-4, 3GPP (Sep. 30, 2016) Agenda Item 8.1.5.1.
Qualcomm., et al., "WF on Multiplexing of SYNC and Broadcast Signals", 3GPP TSG RAN WG1 Meeting #86b, R1-1610550, Lisbon, Portugal Oct. 10-14, 2016, 5 Pages.
Qualcomm., et al., "WF on Multiplexing of SYNC and Broadcast Signals", 3GPP TSG RAN WG1 Meeting #86b, R1-16xxxxx, Lisbon, Portugal Oct. 10-14, 2016, 6 Pages.
Qualcomm., et al., "WF on Sync Signal Structure", 3GPP TSG RAN WG1 Meeting #87, R1-1613154, Reno, USA, Nov. 14-18, 2016, 3 Pages.
Qualcomm Incorporated: "Single Beam PBCH Design Considerations", 3GPP Draft, 3GPP TSG-RAN WG1 #86bis, R1-1610157, 3rd Generation Partnership Project, Mobile Competence Centre, 650, Route Des Lucioles, F-06921 Sophia-Antipolis Cedex, France, vol. RAN WG1, No. Lisbon, Portugal, Sep. 10, 2016-Sep. 14, 2016, Oct. 1, 2016, XP051159960, 3 Pages, Oct. 9, 2016, Chapters 2.1, 2.2 and 2.4, p. 1-p. 2.
Qualcomm Incorporated: "Single Beam Synchronization Design", 3GPP TSG-RAN WG1 #86b, R1-1610156, 3rd Generation Partnership Project, Mobile Competence Centre, 650, Route Des Lucioles, F-06921 Sophia-Antipolis Cedex, France, vol. RAN WG1, No. Lisbon, Portugal, Sep. 9, 2016-Sep. 14, 2016, Oct. 9, 2016, XP051150179, Oct. 1, 2016, 6 Pages, p. 2-p. 6.
Qualcomm Incorporated: "Multi-Beam PBCH Design", 3GPP Tsg Ran WG1 Meeting #87, R1-1612028, Reno, NV, U.S.A., Nov. 14-18, 2016, Nov. 6, 2016, 5 Pages.
Qualcomm Incorporated: "Multi-Beam SYNC Design", 3GPP TSG RAN WG1 Meeting #87, R1-1612024, 3rd Generation Partnership Project (3GPP), Mobile Competence Centre, 650, Route Des Lucioles, F-06921 Sophia-Antipolis Cedex, France, vol. RAN WG1, No. Reno, Nevada, USA, Nov. 14-18, 2016, 10 Pages, XP051175986, Part 2.
Qualcomm Incorporated: "Multi-Beam SYNC Design", 3GPP TSG RAN WG1 Meeting #86b, R1-1610159, 3rd Generation Partnership Project, Mobile Competence Centre, 650, Route Des Lucioles, F-06921 Sophia-Antipolis Cedex, France, vol. RAN WG1, No. Lisbon, Portugal, Oct. 10, 2016-Oct. 14, 2016, Oct. 9, 2016, XP051150182, 9 Pages, Section 2.7.
Qualcomm Incorporated: "Multi-beam SYNC Evaluation", 3GPP TSG RAN WG1 Meeting #86b, R1-1610161, Lisbon, Portugal, Oct. 10-14, 2016, 8 Pages.
Qualcomm Incorporated: "Multiplexing of Waveforms for Sync", 3GPP TSG RAN WG1 Meeting #87, R1-1612026, 3rd Generation Partnership Project (3GPP), Mobile Competence Centre, 650, Route Des Lucioles, F-06921 Sophia-Antipolis Cedex, France, vol. RAN WG1, No. Reno, Nevada, USA, Nov. 14 to 18, 2016, Nov. 13, 2016, XP051175988, 9 Pages, Part 2 and Fig. 1.
Qualcomm Incorporated: "Revised Simulation Assumptions and Metrics for SYNC Evaluation", 3GPP TSG-RAN WG1 #86b, R1-1610158, Sep. 10-14, 2016 Lisbon, Portugal, 3 Pages.
Qualcomm: "WF on Assumptions for Comparing Different SYNC Multiplexing Techniques", 3GPP TSG-RAN1 Meeting #86b, R1-1611015, Lisbon, Portugal, Oct. 10-14, 2016, 2 Pages.
Qualcomm: "WF on Numerology for Sync Signals", 3GPP TSG RAN WG1 Meeting #87, R1-1613153, Reno, Nevada, Nov. 14-18, 2016, 3 Pages.

(56) References Cited

OTHER PUBLICATIONS

Qualcomm: "WF on SYNC Periodicity", 3GPP TSG RAN WG1 Meeting #86bis, R1-1610538, Lisbon, Portugal Oct. 10-14, 2016, 3 Pages.
Qualcomm: "WF on SYNC Periodicity", 3GPP TSG RAN WG1 Meeting #86bis, R1-1610722, Lisbon, Portugal Oct. 10-14, 2016, 4 Pages.
Samsung: "Carrier Raster and Synchronization Signal Transmission", 3GPP TSG RAN WG1 Meeting #86bis, R1-1609114, Lisbon, Portugal, Oct. 10-14, 2016, pp. 1-2.
Samsung: "Discussion on Beam Sweeping for Initial Access Signals", 3GPP TSG RAN WG1 Meeting #86bis, R1-1609107, Lisbon, Portugal, Oct. 10-14, 2016, 6 Pages.
Samsung: "Discussion on Essential SI Delivery for Over6GHz", 3GPP TSG RAN WG1 Meeting #87, R1-1612456, Reno, USA Nov. 14-18, 2016, 4 Pages.
Samsung: "Discussion on Minimum Bandwidth for NR", 3GPP TSG RAN WG1 Meeting #86bis, R1-1609106, Lisbon, Portugal, Oct. 10-14, 2016, pp. 1-3.
Samsung: "Discussion on Multiplexing Initial Access Signals", 3GPP TSG RAN WG1 #87, R1-1612451, Reno, USA Nov. 14-18, 2016, 5 Pages.
Samsung: "Discussion on NR Paging Design", 3GPP TSG RAN WG1 Meeting #86bis, R1-1609115, Lisbon, Portugal, Oct. 10-14, 2016, pp. 1-4.
Samsung: "Discussion on SI Delivery for Multi-beam Before RACH", 3GPP TSG RAN WG1 Meeting #86bis, R1-1609109, Lisbon, Portugal, Oct. 10-14, 2016, 4 Pages.
Samsung: "Discussion on SS Block/Bust/Burst Set for the Multi-Beam Case", 3GPP TSG RAN WG1 Meeting #87, R1-1612450, Reno, USA Nov. 14-18, 2016, 3 Pages.
Samsung: "Essential System Information (SI) and On-Demand SI", 3GPP TSG RAN WG1#87, R1-1612457, Reno, USA Nov. 14-18, 2016, 3 Pages.
Samsung: "Initial Access Design Consideration for Unified Framework", 3GPP TSG RAN WG1 Meeting #86bis, R1-1609110, Lisbon, Portugal, Oct. 10-14, 2016, 5 Pages.
Samsung: "Multiplexing of Synchronization Signals and System Information Delivery Channels for Below 6 GHz and Above 6 GHz", 3GPP TSG RAN WG1 Meeting #86bis, 3GPP Draft; R1-1609111, vol. RAN WG1, No. Lisbon, Portugal, Oct. 10, 2016-Oct. 14, 2016, Oct. 9, 2016, 6 Pages, Oct. 14, 2016, XP051149160, Retrieved from the Internet: URL: http://www.3gpp.org/ftp/Meetings_3GPP_SYNC/RAN1/Docs/ [retrieved on Oct. 9, 2016].
Samsung: "Numerology for NR synchronization signal", 3GPP TSG RAN WG1 Meeting #86bis, R1-1609112, Lisbon, Portugal, Oct. 10-14, 2016, Sep. 30, 2016, pp. 1-4.
Samsung: "Overview on Issues on NR Downlink Synchronization", 3GPP TSG RAN WG1 Meeting #86bis, R1-1609113, Lisbon, Portugal Oct. 10-14, 2016, 5 Pages.

Samsung: "Overview on System Information Delivery and Beam Alignment /Association", 3GPP Draft, 3GPP TSG RAN WG1 #86-bis, R1-1609105, 3GPP, Lisbon, Portugal, Oct. 10-14, 2016, 5 Pages.
Samsung: "Time Domain Mapping of Initial Access Signals for the Multi-Beam Case", 3GPP TSG RAN WG1 Meeting #86bis, R1-1609108, Lisbon, Portugal, Oct. 10-14, 2016, 3 Pages.
Samsung: "WF on Multiplexing of Sync Signal", 3GPP TSG RAN WG1 Meeting #86b, R1-1610567, Lisbon, Portugal Oct. 10-14, 2016, 3 Pages.
Sharp: "DL Synchronization Signal Structure in NR", 3GPP TSG RAN WG1 #87, R1-1612621, Reno, USA, Nov. 14, 2016-Nov. 18, 2016, pp. 1-4, Nov. 4, 2016, Internet URL: http://www.3gpp.org/ftp/tsg_ran/WG1_RL1/TSGR1_87/Docs/R1-1612621.zip.
Sharp: "Numerology for DL Synchronization Signal in Nr," 3GPP Draft, 3GPP TSG RAN WG1 Meeting #86bis, R1-1609875, 3rd Generation Partnership Project (3GPP), Mobile Competence Centre, 650, Route Des Lucioles, F-06921, Sophia-Anti Polls Cedex, France, vol. RAN WG1, No. Lisbon, Portugal, Oct. 9, 2016, Oct. 10-14, 2016, pp. 1-4, XP051149902, Figs.1, 3, Sections 1 and 2.1.
Sony: "Consideration on NR Synchronization Signal Design", 3GPP TSG RAN WG1 Meeting #86bis, R1-1608944, Lisbon, Portugal, Oct. 10-14, 2016, 4 Pages.
Sony: "Consideration on NR Synchronization Signal Design", 3GPP TSG RAN WG1 Meeting #87, R1-1611552, Reno, USA, Nov. 14-18, 2016, 5 Pages.
Sony: "Sub-Carrier Spacing Considerations for NR DL Synchronization", 3GPP TSG RAN WG1 Meeting #86bis, R1-1608951, Lisbon, Portugal Oct. 10-14, 2016, 5 Pages.
Spreadtrum Communications: "Discussion on Synchronization Signal Design for NR", 3GPP TSG RAN WG1 Meeting #86, R1-1608924, Lisbon, Portugal. Oct. 10-14, 2016, 3 Pages.
Xinwei: "Discussion of NR Initial Access", 3GPP TSG RAN WG1 Meeting #86b, R1-1609697, Lisbon, Portugal, Oct. 10-14, 2016, 7 Pages.
Zte Corporation., et al., "Issues Related to NR-SS", 3GPP TSG RAN WG1 Meeting #87, R1-1611267, Reno, USA, Nov. 14-18, 2016, 8 Pages.
Zte, et al., "Considerations on SS Block Design", 3GPP Draft, 3GPP TSG RAN WG1 Meeting #87, R1-1611268, 3rd Generation Partnership Project (3GPP), Mobile Competence, 650, Route Des Lucioles, F-06921 Sophia-Antipolis Cedex, France, vol. RAN WG1, No. Reno, USA, Nov. 13, 2016, XP051175249, 7 pages, Retrieved from the Internet: URL: http://www.3gpp.org/ftp/Meetings_3GPP_SYNC/RAN1/Docs/ [retrieved on Nov. 13, 2016], figure 1 sections 1-5.
Zte., et al., "Considerations on Sweeping Time Interval in NR", 3GPP TSG RAN WG1 Meeting #86b, R1-1608966, Lisbon, Portugal, Oct. 10-14, 2016, 9 Pages.
Zte., et al., "Issues Related to NR-PBCH", 3GPP TSG RAN WG1 Meeting #87, R1-1611443, Reno, USA, Nov. 14-18, 2016, 3 Pages.
Zte: "Frequency and Channel Raster Issue in NR", 3GPP TSG RAN WG1 Meeting #86bis, R1-1608967, Lisbon, Portugal Oct. 10-14, 2016, 5 Pages.

DATA AND CONTROL CHANNELS IN SYNCHRONIZATION BURSTS FOR MILLIMETER WAVE NEW RADIO

CROSS REFERENCES

The present application for patent is a Continuation of U.S. patent application Ser. No. 17/404,844 by SUN et al., entitled "DATA AND CONTROL CHANNELS IN SYNCHRONIZATION BURSTS FOR MILLIMETER WAVE NEW RADIO," filed Aug. 17, 2021, which is a Continuation of U.S. patent application Ser. No. 15/673,350 by SUN, et al., entitled "DATA AND CONTROL CHANNELS IN SYNCHRONIZATION BURSTS FOR MILLIMETER WAVE NEW RADIO," filed Aug. 9, 2017, which claims priority to U.S. Provisional Patent Application No. 62/421,127 by SUN, et al., entitled "DATA AND CONTROL CHANNELS IN SYNCHRONIZATION BURSTS FOR MILLIMETER WAVE NEW RADIO," filed Nov. 11, 2016, assigned to the assignee hereof.

BACKGROUND

Field of the Disclosure

The present disclosure, for example, relates to wireless communication systems, and more particularly to transmitting data and control information via data and control channels in a synchronization burst for millimeter (mmW) new radio.

Description of Related Art

Wireless communication systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include code division multiple access (CDMA) systems, time division multiple access (TDMA) systems, frequency division multiple access (FDMA) systems, and orthogonal frequency division multiple access (OFDMA) systems, (e.g., a Long Term Evolution (LTE) system, or a New Radio (NR) system). A wireless multiple-access communications system may include a number of base stations or access network nodes, each simultaneously supporting communication for multiple communication devices, which may be otherwise known as user equipment (UE).

By way of example, a wireless multiple-access communication system may include a number of base stations, each simultaneously supporting communication for multiple communication devices, otherwise known as user equipments (UEs). A base station may communicate with UEs on downlink channels (e.g., for transmissions from a base station to a UE) and uplink channels (e.g., for transmissions from a UE to a base station).

Wireless communication systems may operate in millimeter wave (mmW) frequency ranges, e.g., 28 GHz, 40 GHz, 60 GHz, etc. Wireless communication at these frequencies may be associated with increased signal attenuation (e.g., path loss), which may be influenced by various factors, such as temperature, barometric pressure, diffraction, etc. As a result, signal processing techniques, such as beamforming, may be used to coherently combine energy and overcome the path losses at these frequencies. Due to the increased amount of path loss in mmW communication systems, transmissions from the base station and/or the UE may be beamformed.

Wireless communications between two wireless nodes, e.g., between a base station and a UE, may use beams or beamformed signals for transmission and/or reception. A base station may transmit beamformed signals on DL beams associated with the base station. A UE may receive a signal on one or more DL beams associated with the UE. The DL beam associated with the base station and the DL beam associated with the UE used for DL communications between the base station and the UE constitute a DL beam pair. Similarly, a UE may transmit beamformed signals on UL beams associated with the UE. A base station may receive a signal on one or more UL beams associated with the base station. The UL beam associated with the UE and the UL beam associated with the base station used for UL communications between the UE and the base station constitute an UL beam pair. In some instances, the DL beam pair and the UL beam pair may be the same (e.g., may represent the same beam pairs). In other instances, differences may exist between a DL beam pair and an UL beam pair.

SUMMARY

Some examples of wireless communication systems support transmitting data and control information in a synchronization burst for mmW new radio. In some examples, transmitting data and control information may be via data and control channels of a wireless node. The data or the control information may correspond to one or more synchronization blocks in a synchronization slot. A synchronization slot may include a predetermined number of synchronization blocks (e.g., fourteen synchronization blocks). A synchronization block may, in some examples, be associated with an OFDM symbol. A transmission beam (e.g., DL transmission beam) may be associated with a synchronization block. In some cases, a wireless node may transmit data or control information based on the synchronization blocks, i.e., OFDM symbols. In some examples, a wireless node may transmit data or control information via data and control channels via a transmission beam associated with a synchronization block.

A method of millimeter wave wireless communication is described. The method may include configuring a synchronization slot associated with a plurality of synchronization blocks, configuring a transmission of each synchronization block of the plurality of synchronization blocks based at least in part on the configured synchronization slot, assigning a synchronization region to a first frequency portion associated with a transmission beam of each synchronization block, assigning at least one of a data region or a control region to a second frequency portion associated with the transmission beam of each synchronization block, and transmitting a synchronization signal during the synchronization region and transmitting at least one of data signal during the data region or control information during the control region to a wireless node.

Another apparatus for millimeter wave wireless communication is described. The apparatus may include a processor, memory in electronic communication with the processor, and instructions stored in the memory. The instructions may be operable to cause the processor to configure a synchronization slot associated with a plurality of synchronization blocks, configure a transmission of each synchronization block of the plurality of synchronization blocks based at least in part on the configured synchronization slot, assign a synchronization region to a first frequency portion associated with a transmission beam of each synchronization block, assign at least one of a data region or a control region to a second frequency portion associated with the transmission beam of each synchronization block, and transmit a synchronization signal during the synchronization region and transmitting at least one of data signal during the data region or control information during the control region to a wireless node.

In some examples of the method and apparatus described above, configuring the transmission of each synchronization block of the plurality of synchronization blocks may further include processes, features, means, or instructions for identifying a transmission order associated with the synchronization slot, and transmitting each synchronization block based at least in part on the transmission order, wherein each synchronization block is transmitted at a different time. In some examples of the method and apparatus described above, the first frequency portion and the second frequency portion of the plurality of synchronization blocks is associated with a same transmission beam.

Some examples of the method and apparatus described above may further include processes, features, means, or instructions for transmitting the synchronization signal and at least one of the data or the control information to the wireless node using the same transmission beam. Some examples of the method and apparatus described above may further include processes, features, means, or instructions for receiving a RACH signal from the wireless node during a subframe associated with the transmission beam. Some examples of the method and apparatus described above may further include processes, features, means, or instructions for transmitting at least one of data signal during the data region or the control information during the control region to a wireless node.

In some examples of the method and apparatus described above, configuring the synchronization block may further include processes, features, means, or instructions for dividing at least one synchronization block of the plurality of synchronization blocks into multiple orthogonal frequency division multiplexing (OFDM) symbols based at least in part on time-division multiplexing (TDM).

In some examples of the method and apparatus described above, dividing the at least one synchronization block into multiple OFDM symbols based at least in part on the TDM may further include processes, features, means, or instructions for transmitting a synchronization channel using the multiple OFDM symbols. In some examples of the method and apparatus described above, the synchronization channel comprises at least one of a physical broadcast channel (PBCH), or a primary synchronization signal (PSS), or a secondary synchronization signal (SSS), or a combination thereof.

In some examples of the method and apparatus described above, configuring the synchronization block may further include processes, features, means, or instructions for applying a same OFDM symbol structure for the data region or the control region and the synchronization region. Some examples of the method and apparatus described above may further include processes, features, means, or instructions for configuring the synchronization block based at least in part on applying a first OFDM symbol structure to the synchronization region and a second OFDM symbol structure to the data region or the control region, the first OFDM symbol structure is different from the second OFDM symbol structure.

Some examples of the method and apparatus described above may further include processes, features, means, or instructions for configuring the plurality of synchronization blocks based at least in part on frequency-division multiplexing (FDM), and assigning at least one of the data region or the control region to each synchronization block based at least in part on the configuring, wherein the data region or the control region spans a duration of the synchronization region.

In some examples of the method and apparatus described above, the control information comprises an uplink transmission grant for the wireless node. In some examples of the method and apparatus described above, the synchronization region is associated with a beamformed direction of the wireless node. Some examples of the method and apparatus described above may further include processes, features, means, or instructions for identifying a beam pair associated with the wireless node, and assigning the beam pair to the synchronization region.

In some examples of the method and apparatus described above, the wireless node is preconfigured with an uplink transmission beam and a downlink reception beam. Some examples of the method and apparatus described above may further include processes, features, means, or instructions for transmitting the synchronization signal to the wireless node based at least in part on a periodic interval.

Another method of millimeter wave wireless communication is described. The method may include monitoring a synchronization channel associated with a synchronization block of a synchronization slot and receiving a synchronization signal associated with a first frequency portion associated with a downlink reception beam of the synchronization block and at least one of data or control information associated with a second frequency portion associated with the downlink reception beam of the synchronization block during the synchronization slot.

Some examples of the method described above may further include processes, features, means, or instructions for configuring to detect at least one of data or control information associated with the synchronization block, determining an absence of at least one of the data or control information during the synchronization block, and transitioning into a micro-sleep state based at least in part on the determining. Some examples of the method and apparatus described above may further include processes, features, means, or instructions for transmitting a RACH signal during a subframe of an uplink transmission beam associated with the downlink reception beam.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purpose of illustration and description only, and not as a definition of the limits of the claims.

BRIEF DESCRIPTION OF THE DRAWINGS

A further understanding of the nature and advantages of the present invention may be realized by reference to the following drawings. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

Figure 1:
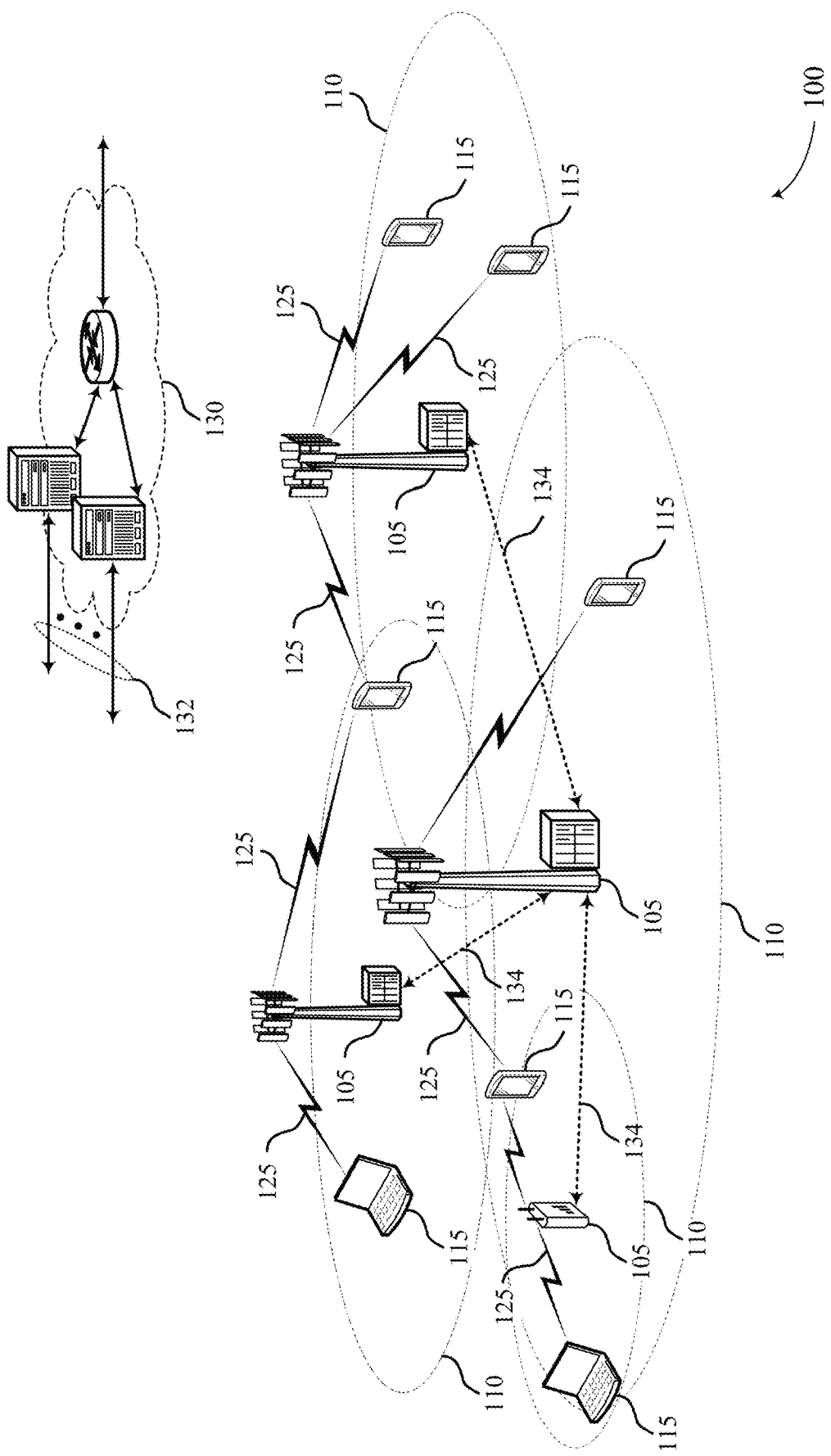
FIG. 1 illustrates an example of a wireless communications system in accordance with various aspects of the present disclosure.

Some examples of wireless communication systems support transmitting data and control information in a synchronization burst for mmW new radio. In some examples, transmitting data and control information may be via data and control channels of a wireless node. The data or the control information may correspond to one or more synchronization blocks in a synchronization slot. A synchronization slot may include a predetermined number of synchronization blocks (e.g., fourteen synchronization blocks). A synchronization block may, in some examples, be associated with an OFDM symbol. In some cases, a transmission beam may be associated with a synchronization block. A wireless node may transmit data or control information based on the synchronization blocks, i.e., OFDM symbols.

Wireless nodes in a wireless communication system may identify a beam pair (i.e., DL transmission beam/DL reception beam or an UL transmission beam/UL reception beam) for communicating information between each other. Based on identifying the beam pair, wireless nodes may establish a communication link for transmitting or receiving data and control information via a data channel or control channel. In some examples of the wireless communication system, a wireless node may beamform individual data or control channels associated with the wireless node. In one case, a synchronization channel of a wireless node may be beamformed in a direction of another wireless node. In another example, a random-access channel (RACH) of the wireless node may be beamformed in the direction of the other wireless node. The wireless node may transmit access information to the other wireless node based on the beamformed direction of the RACH. Wireless nodes whose data or control channels are not beamformed may have limited coverage (e.g., may not be able to communicate information to other wireless nodes in the wireless communication system).

In some cases, antennas of a wireless node in a wireless communication system may be restricted from being frequency-division multiplexed (FDM). As a result, it may be difficult for a wireless node in the wireless communication system to transmit data or control information to different wireless nodes using FDM techniques. As an alternative, a wireless node may perform time-division multiplexing (TDM) on one or more synchronization blocks of the synchronization slot to transmit data or control information to different wireless nodes during a synchronization burst.

A wireless node may transmit data or control information to another wireless node via one or more synchronization blocks in the synchronization slot. Each synchronization block within the synchronization slot may be transmitted using a single OFDM symbol. Additionally, each synchronization block may be beamformed to a particular direction (e.g., direction associated with a wireless node of interest). Transmitting data or control information via the OFDM symbol may, however, be resource expensive to wireless nodes (e.g., transmission power, data size, etc.).

For example, a wireless node may use one OFDM symbol to transmit control information to another wireless node and switch transmission beams between OFDM symbols in a synchronization slot to transmit data to the other or additional wireless nodes. In some cases, a wireless node may divide an OFDM symbol (i.e., synchronization block) into multiple OFDM symbols. In some cases, the sub-OFDM symbols may include PSS, or SSS, or PBCH information, or a combination thereof. The multiple OFDM symbols (e.g., that include the PSS, or SSS, or PBCH information), however, may not span the full bandwidth of the OFDM symbol. As a result, a portion of the OFDM symbol may go unused by the wireless node.

A wireless node may utilize the unused portion of the OFDM symbol to transmit control information. Since a synchronization block may be associated with a single transmission beam, a wireless node may be precluded from transmitting any data or control information using a different transmission beam for the same OFDM symbol. By utilizing the unused portion of the OFDM symbol, a wireless node in wireless communication systems may transmit both data and control information using the same transmission beam of the synchronization block. Thus, the wireless node may transmit data and control information without having to switch transmission beams and consuming additional synchronization blocks in a synchronization slot to transmit control information independently. As a result, the bandwidth of the OFDM symbol may be fully utilized by the wireless node.

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in other examples.

FIG. 1 illustrates an example of a wireless communication system 100 in accordance with various aspects of the present disclosure. The wireless communication system 100 includes base stations 105, UEs 115, and a core network 130. In some examples, the wireless communication system 100 may be a LTE (or LTE-Advanced) network, or a New Radio (NR) network. In some cases, wireless communication system 100 may support enhanced broadband communications, ultra-reliable (i.e., mission critical) communications, low latency communications, and communications with low-cost and low-complexity devices.

A base station 105 may transmit data or control information to UE 115 via one or more synchronization blocks in a transmission synchronization slot of base station 105. Each synchronization block within the synchronization slot may be transmitted using a single OFDM symbol. Additionally, each synchronization block may be beamformed to a particular direction, e.g., a direction towards UE 115. Base station 105 may use one OFDM symbol to transmit control information to UE 115 and switch transmission beams between OFDM symbols in the synchronization slot to transmit data to UE 115. In some cases, base station 105 may divide an OFDM symbol (i.e., synchronization block) into multiple OFDM symbols. In some cases, the sub-OFDM symbols may include PSS, or SSS, or PBCH information, or a combination thereof. The multiple OFDM symbols (e.g., that include the PSS, or SSS, or PBCH information), however, may not span the full bandwidth of the OFDM symbol. As a result, a portion of the OFDM symbol may go unused by base station 105.

Base station 105 may use the unused portion of the OFDM symbol to transmit control information to UE 115. Since a synchronization block may be associated with a single transmission beam, base station 105 may be precluded from transmitting any data or control information using a different transmission beam for the same OFDM symbol. By using the unused portion of the OFDM symbol, base station 105 may transmit both data and control information to UE 115 using the same transmission beam of the synchronization block. Thus, base station 105 may transmit data and control information without having to switch transmission beams and consume an additional synchronization block in a synchronization slot to transmit control information independently.

In some cases, UE 115 may be in a connected mode with base station 105. UE 115 may wake up at a beginning of a synchronization slot and determine whether any transmission grants exist. If UE 115 determines that no transmission grants exist for the synchronization slot associated with UE 115, UE 115 may transition into a micro-sleep state to save power. In some examples, UE 115 may wake up during a transmission period associated with a synchronization beam of UE 115. For example, UE 115 may wake up at a predetermined schedule when base station 105 transmit a synchronization beam associated with UE 115.

In some cases, wireless communication system 100 may provide UL control transmission during a random access channel (RACH) subframe. Base station 105 may transmit beamformed signals (e.g., synchronization signals) on DL beams associated with the base station 105. For example, base station 105 may transmit a synchronization block using a DL transmission beam during a transmission period (e.g., associated with a subframe). UE 115 may receive a beamformed signal (e.g., a synchronization signal) on one or more DL reception beams associated with UE 115. The DL beam associated with base station 105 and the DL beam associated with UE 115 used for DL communications may constitute a DL beam pair. In the case UE 115 may receive multiple beamformed signals from base station 105, UE 115 may identify and select a beamformed signal based on a metric. For example, UE 115 may determine a received signal strength indicator (RSSI) of the multiple received beamformed signals and select a received beamformed signal based on the RSSI.

UE 115 may also receive or identify a transmission schedule associated with base station 105. For example, UE 115 may determine that a transmission beam is received from base station 105 at a predetermined interval (e.g., subframe). UE 115 may make this determination based on identifying a beam index associated with the transmission beam of base station 105 and identifying a transmission interval associated with the transmission beam. UE 115 may also identify when the base station 105 is listening for signals (e.g., mmW beamformed signals) from other wireless nodes (e.g., UEs) during a listening interval associated with the transmission beam. UE 115 may transmit a RACH signal to base station 105 using a transmission beam (e.g., UL transmission beam) during a subframe associated with a transmission beam of base station 105. Base station 105 may receive the RACH signal from UE 115 during the subframe associated with the transmission beam. That is, base station 105 may transmit a synchronization block using a transmission beam at a first time, UE 115 may transmit a RACH signal to base station 105 at a second time associated with the transmission beam. At the second time, the base station 105 may be listening for transmission from UE 115 using the same beam. The RACH signal may be beamformed in the direction of base station 105. UE 115 may also transmit access information to base station 105 based on the beamformed direction of the RACH.

Base stations 105 may wirelessly communicate with UEs 115 via one or more base station antennas. Each base station 105 may provide communication coverage for a respective geographic coverage area 110. Communication links 125 shown in wireless communication system 100 may include uplink (UL) transmissions from a UE 115 to a base station 105, or downlink (DL) transmissions, from a base station 105 to a UE 115. Control information and data may be multiplexed on an uplink channel or downlink according to various techniques. Control information and data may be multiplexed on a downlink channel, for example, using time division multiplexing (TDM) techniques, frequency division multiplexing (FDM) techniques, or hybrid TDM-FDM techniques. In some examples, the control information transmitted during a transmission time interval (TTI) of a downlink channel may be distributed between different control regions in a cascaded manner (e.g., between a common control region and one or more UE-specific control regions). For example, base station 105 may multiplex different data signals, whereby the channel is divided into multiple time slots and the different signals are mapped to different time slots. Alternatively, base station 105 may multiplex different data signals for transmission on a single communications channel, whereby each signal is assigned a non-overlapping frequency range within the main channel.

UEs 115 may be dispersed throughout the wireless communication system 100, and each UE 115 may be stationary or mobile. A UE 115 may also be referred to as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. A UE 115 may also be a cellular phone, a personal digital assistant (PDA), a wireless modem, a wireless communication device, a handheld device, a tablet computer, a laptop computer, a cordless phone, a personal electronic device, a handheld device, a personal computer, a wireless local loop (WLL) station, an Internet of things (IoT) device, an Internet of Everything (IoE) device, a machine type communication (MTC) device, an appliance, an automobile, or the like.

In some cases, a UE 115 may also be able to communicate directly with other UEs (e.g., using a peer-to-peer (P2P) or device-to-device (D2D) protocol). One or more of a group of UEs 115 utilizing D2D communications may be within the geographic coverage area 110 of a cell. Other UEs 115 in such a group may be outside the geographic coverage area 110 of a cell, or otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out independent of a base station 105.

Base stations 105 may communicate with the core network 130 and with one another. For example, base stations 105 may interface with the core network 130 through backhaul links 132 (e.g., S1, etc.). Base stations 105 may communicate with one another over backhaul links 134 (e.g., X2, etc.) either directly or indirectly (e.g., through core network 130). Base stations 105 may perform radio configuration and scheduling for communication with UEs 115, or may operate under the control of a base station controller (not shown). In some examples, base stations 105 may be macro cells, small cells, hot spots, or the like. Base stations 105 may also be referred to as eNodeBs (eNBs) 105.

A base station 105 may be connected by an S1 interface to the core network 130. The core network may be an evolved packet core (EPC), which may include at least one mobility management entity (MME), at least one S-GW, and at least one P-GW. The MME may be the control node that processes the signaling between the UE 115 and the EPC.

All user IP packets may be transferred through the S-GW, which itself may be connected to the P-GW. The P-GW may provide internet protocol (IP) address allocation as well as other functions. The P-GW may be connected to the network operators IP services. The operators IP services may include the Internet, the Intranet, an IP Multimedia Subsystem (IMS), and a Packet-Switched (PS) Streaming Service (PSS).

The core network 130 may provide access, routing, or mobility functions. At least some of the network devices, such as base station 105 may include subcomponents such as an access network entity, which may be an example of an access node controller (ANC). Each access network entity may communicate with a number of UEs 115 through a number of other access network transmission entities, each of which may be an example of a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

One or more of base station 105 may include a base station synchronization manager as described with reference to FIGS. 6 through 9, which may configure a synchronization slot associated with a plurality of synchronization blocks, configure a transmission of each synchronization block of the plurality of synchronization blocks based at least in part on the configured synchronization slot, assign a synchronization region to a first frequency portion of each synchronization block, assign at least one of a data region or a control region to a second frequency portion associated with the transmission beam of each synchronization block, and transmit a synchronization signal during the synchronization region and transmitting at least one of a data signal during the data region or control information during the control region to UE 115.

UEs 115 may include a UE synchronization manager as described with reference to FIGS. 10 through 13, which may monitor a synchronization channel associated with a synchronization block of a synchronization slot, and receive a synchronization signal associated with a first frequency portion associated with a downlink reception beam of the synchronization block and at least one of data or control information associated with a second frequency portion associated with the downlink reception beam of the synchronization block during the synchronization slot.

Wireless communication system 100 may operate in an ultra-high frequency (UHF) frequency region using frequency bands from 700 MHz to 2600 MHZ (2.6 GHZ), although in some cases wireless local area network (WLAN) networks may use frequencies as high as 4 GHz. This region may also be known as the decimeter band, since the wavelengths range from approximately one decimeter to one meter in length. UHF waves may propagate mainly by line of sight, and may be blocked by buildings and environmental features. However, the waves may penetrate walls sufficiently to provide service to UEs 115 located indoors. Transmission of UHF waves is characterized by smaller antennas and shorter range (e.g., less than 100 km) compared to transmission using the smaller frequencies (and longer waves) of the high frequency (HF) or very high frequency (VHF) portion of the spectrum. In some cases, wireless communication system 100 may also utilize extremely high frequency (EHF) portions of the spectrum (e.g., from 30 GHz to 300 GHz). This region may also be known as the millimeter band, since the wavelengths range from approximately one millimeter to one centimeter in length. Thus, EHF antennas may be even smaller and more closely spaced than UHF antennas. In some cases, this may facilitate use of antenna arrays within a UE 115 (e.g., for directional beamforming). However, EHF transmissions may be subject to even greater atmospheric attenuation and shorter range than UHF transmissions.

Thus, wireless communication system 100 may support millimeter wave (mmW) communications between UEs 115 and base stations 105. Devices operating in mmW or EHF bands may have multiple antennas to allow beamforming. That is, a base station 105 may use multiple antennas or antenna arrays to conduct beamforming operations for directional communications with a UE 115. Beamforming (which may also be referred to as spatial filtering or directional transmission) is a signal processing technique that may be used at a transmitter (e.g. a base station 105) to shape and/or steer an overall antenna beam in the direction of a target receiver (e.g. a UE 115). This may be achieved by combining elements in an antenna array in such a way that transmitted signals at particular angles experience constructive interference while others experience destructive interference.

Multiple-input multiple-output (MIMO) wireless systems use a transmission scheme between a transmitter (e.g., a base station) and a receiver (e.g., a UE), where both transmitter and receiver are equipped with multiple antennas. Some portions of wireless communication system 100 may use beamforming. For example, base station 105 may have an antenna array with a number of rows and columns of antenna ports that the base station 105 may use for beamforming in its communication with UE 115. Signals may be transmitted multiple times in different directions (e.g., each transmission may be beamformed differently). A mmW receiver (e.g., a UE 115) may try multiple beams (e.g., antenna subarrays) while receiving the synchronization signals.

In some cases, the antennas of a base station 105 or UE 115 may be located within one or more antenna arrays, which may support beamforming or MIMO operation. One or more base station antennas or antenna arrays may be collocated at an antenna assembly, such as an antenna tower. In some cases, antennas or antenna arrays associated with a base station 105 may be located in diverse geographic locations. A base station 105 may use multiple antennas or antenna arrays to conduct beamforming operations for directional communications with a UE 115.

In some cases, wireless communication system 100 may be a packet-based network that operates according to a layered protocol stack. In the user plane, communications at the bearer or Packet Data Convergence Protocol (PDCP) layer may be IP-based. A Radio Link Control (RLC) layer may in some cases perform packet segmentation and reassembly to communicate over logical channels. A Medium Access Control (MAC) layer may perform priority handling and multiplexing of logical channels into transport channels. The MAC layer may also use Hybrid ARQ (HARQ) to provide retransmission at the MAC layer to improve link efficiency. In the control plane, the Radio Resource Control (RRC) protocol layer may provide establishment, configuration, and maintenance of an RRC connection between a UE 115 and a base station 105 or core network 130 supporting radio bearers for user plane data. At the Physical (PHY) layer, transport channels may be mapped to physical channels.

Time intervals in LTE or NR may be expressed in multiples of a basic time unit (which may be a sampling period of $T_s=1/30,720,000$ seconds). Time resources may be organized according to radio frames of length of 10 ms ($T_f=307200\ T_s$), which may be identified by a system frame number (SFN) ranging from 0 to 1023. Each frame may include ten 1 ms subframes numbered from 0 to 9. A subframe may be further divided into two 0.5 ms slots, each of which contains 6 or 7 modulation symbol periods (depending on the length of the cyclic prefix prepended to each symbol). Excluding the cyclic prefix, each symbol contains 2048 sample periods. In some cases the subframe may be the smallest scheduling unit, also known as a TTI. In other cases, a TTI may be shorter than a subframe or may be dynamically selected (e.g., in short TTI bursts or in selected component carriers using short TTIs).

A resource element may consist of one symbol period and one subcarrier (e.g., a 15 KHz frequency range). A resource block may contain 12 consecutive subcarriers in the frequency domain and, for a normal cyclic prefix in each OFDM symbol, 7 consecutive OFDM symbols in the time domain (1 slot), or 84 resource elements. The number of bits carried by each resource element may depend on the modulation scheme (the configuration of symbols that may be selected during each symbol period). Thus, the more resource blocks that a UE receives and the higher the modulation scheme, the higher the data rate may be.

Wireless communication system 100 may support operation on multiple cells or carriers, a feature which may be referred to as carrier aggregation (CA) or multi-carrier operation. A carrier may also be referred to as a component carrier (CC), a layer, a channel, etc. The terms "carrier," "component carrier," "cell," and "channel" may be used interchangeably herein. A UE 115 may be configured with multiple downlink CCs and one or more uplink CCs for carrier aggregation. Carrier aggregation may be used with both FDD and TDD component carriers.

In some cases, wireless communication system 100 may utilize enhanced component carriers (eCCs). An eCC may be characterized by one or more features including: wider bandwidth, shorter symbol duration, shorter transmission time interval (TTIs), and modified control channel configuration. In some cases, an eCC may be associated with a carrier aggregation configuration or a dual connectivity configuration (e.g., when multiple serving cells have a suboptimal or non-ideal backhaul link). An eCC may also be configured for use in unlicensed spectrum or shared spectrum (where more than one operator is allowed to use the spectrum). An eCC characterized by wide bandwidth may include one or more segments that may be utilized by UEs 115 that are not capable of monitoring the whole bandwidth or prefer to use a limited bandwidth (e.g., to conserve power).

In some cases, for data transmission under shared spectrum or unshared spectrum (i.e., unlicensed spectrum) listen-before-talk (LBT) protocols may be required. In some cases, it may violate an LBT rule if a control OFDM symbol in a synchronization slot or an LBT frame serving other UEs is in a different transmission beam. For example, it may not be straight-forward to insert a control symbol in a transmission beam pointed towards a second UE in an LBT frame serving a first UE, where a base station may perform an LBT protocol towards a direction of the first UE. However, in some cases, for synchronization burst transmissions, base station 105 may transmit multiple beams during a synchronization slot. As a result, there may not be a particular transmission beam to perform an LBT for one of the UEs 115. However, during the synchronization burst, base station 105 may transmit small control or data to multiple UEs 115 without performing per UE direction LBT. As a result, base station 105 may piggyback on an existing synchronization channel transmission.

In some cases, an eCC may utilize a different symbol duration than other CCs, which may include use of a reduced symbol duration as compared with symbol durations of the other CCs. A shorter symbol duration may be associated with increased subcarrier spacing. A TTI in an eCC may consist of one or multiple symbols. In some cases, the TTI duration (that is, the number of symbols in a TTI) may be variable. In some cases, an eCC may utilize a different symbol duration than other CCs, which may include use of a reduced symbol duration as compared with symbol durations of the other CCs. A shorter symbol duration is associated with increased subcarrier spacing. A device, such as a UE 115 or base station 105, utilizing eCCs may transmit wideband signals (e.g., 20, 40, 60, 80 MHZ, etc.) at reduced symbol durations (e.g., 16.67 microseconds). A TTI in eCC may consist of one or multiple symbols. In some cases, the TTI duration (that is, the number of symbols in a TTI) may be variable.

In some cases, wireless communication system 100 may utilize both licensed and unlicensed radio frequency spectrum bands. For example, wireless communication system 100 may employ LTE License Assisted Access (LTE-LAA) or LTE Unlicensed (LTE U) radio access technology or NR technology in an unlicensed band such as the 5 Ghz Industrial, Scientific, and Medical (ISM) band. When operating in unlicensed radio frequency spectrum bands, wireless devices such as base station 105 and UE 115 may employ listen-before-talk (LBT) procedures to ensure the channel is clear before transmitting data. In some cases, operations in unlicensed bands may be based on a carrier aggregation (CA) configuration in conjunction with component carriers (CCs) operating in a licensed band. Operations in unlicensed spectrum may include downlink transmissions, uplink transmissions, or both. Duplexing in unlicensed spectrum may be based on frequency division duplexing (FDD), time division duplexing (TDD) or a combination of both.

A secondary synchronization signal (SSS) is used by UE 115 to detect the Long Term Evolution (LTE) frame timing and to obtain the physical layer cell identity group. It is transmitted twice in each 10 ms frame. The SSS sequences are based on maximum length sequences, known as M-sequences. Each SSS sequence is constructed by interleaving, in the frequency-domain, two length-31 Binary Phase Shift Keying (BPSK)-modulated sequences. These two codes are two different cyclic shifts of a single length-31 M-sequence. The cyclic shift indices of the M-sequences are derived from a function of the physical layer cell identity group. The two codes are alternated between the first and second SSS transmissions in each radio frame. This enables the UE to determine the 10 ms radio frame timing from a single observation of a SSS.

A primary synchronization signal (PSS) may be a sequence transmitted by every LTE cell every 5 ms. It may allow UE 115 to obtain slot synchronization and part of the physical layer cell IDentifier (cell ID). Three different sequences exist with a one-to-one mapping to three different cell IDs within each of 168 groups of cell IDs. The primary synchronization signal (PSS) is based on Zadoff-Chu (ZC) sequences.

In some examples, data may be divided into logical channels, transport channels, and physical layer channels. Channels may also be classified into Control Channels and Traffic Channels. Logical control channels may include paging control channel (PCCH) for paging information, broadcast control channel (BCCH) for broadcast system control information, main control channel (MCCH) for transmitting multimedia broadcast multicast services (MBMS) scheduling and control information, dedicated control channel (DCCH) for transmitting dedicated control information, common control channel (CCCH) for random access information, dedicated traffic channel (DTCH) for dedicated user equipment (UE) data, and machine type communication (MTC)H, for multicast data. downlink (DL) transport channels may include BCCH for broadcast information, a DL-SCH for data transfer, paging channel (PCH) for paging information, and multicast channel (MCH) for multicast transmissions. uplink (UL) transport channels may include random access channel (RACH) for access and UL-SCH for data. DL physical channels may include PBCH for broadcast information, PCFICH for control format information, physical downlink control channel (PDCCH) for control and scheduling information, physical HARQ indicator channel (PHICH) for hybrid automatic repeat request (HARQ) status messages, physical downlink shared channel (PDSCH) for user data and physical multicast channel (PMCH) for multicast data. UL physical channels may include physical random access channel (PRACH) for access messages, physical uplink control channel (PUCCH) for control data, and physical uplink shared channel (PUSCH) for user data.

Figure 2:
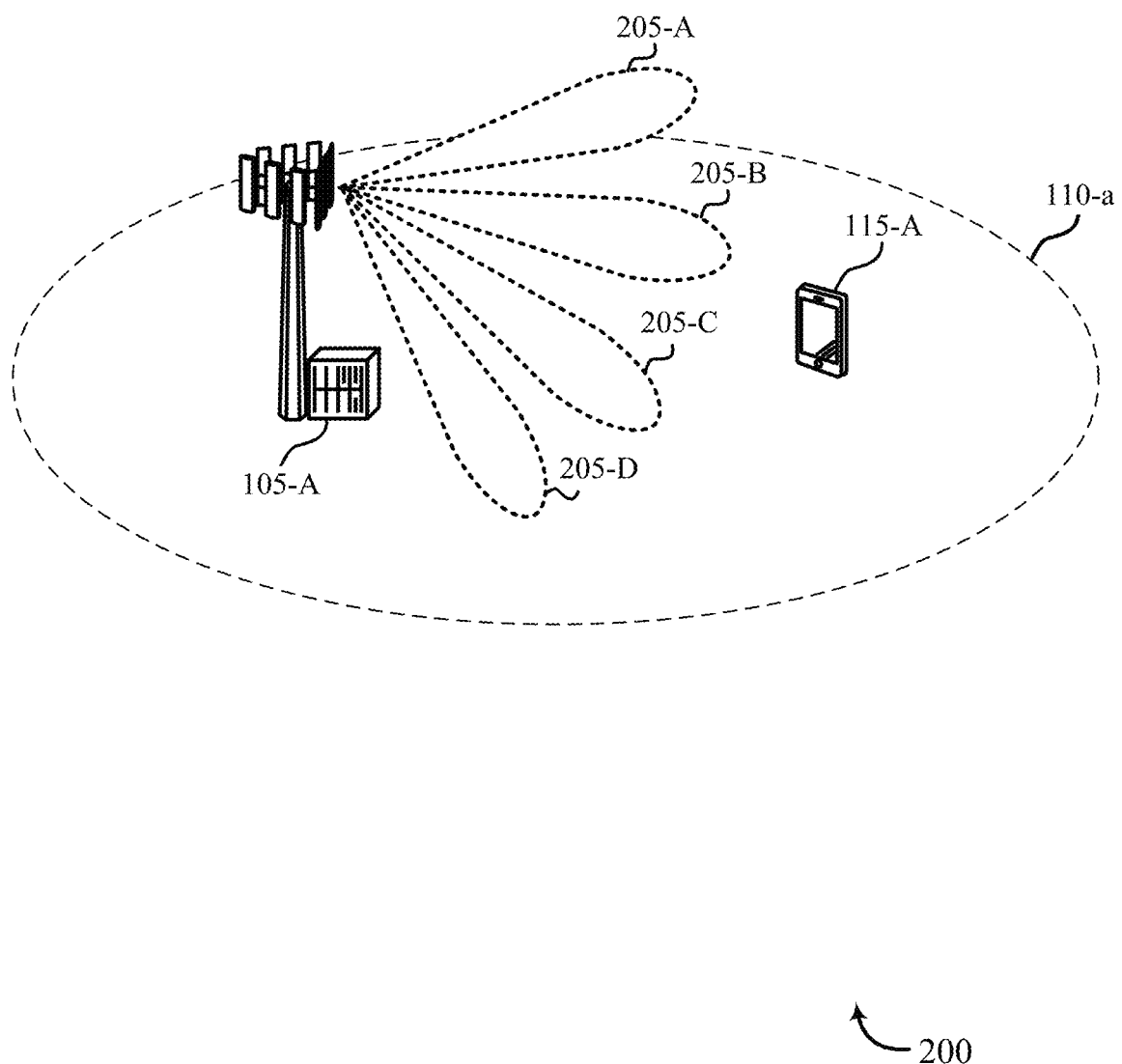
FIG. 2 illustrates an example of a millimeter wireless communication system that supports data and control channels in synchronization bursts for mmW new radio, in accordance with various aspects of the present disclosure.

FIG. 2 illustrates an example of a millimeter wireless communication system 200 that supports data and control channels in synchronization bursts for mmW new radio, in accordance with various aspects of the present disclosure. Wireless communication system 200 may be an example of one or more aspects of wireless communication system 100 of FIG. 1. Some examples of wireless communication system 200 may be a mmW wireless communication system. Wireless communication system 200 may include UE 115-*a* and base station 105-*a*, which may be one or more aspects of UE 115 and base station 105 as described with reference to FIG. 1. The described techniques of wireless communication system 200 supports data and control channels in synchronization bursts between UE 115-*a* and base station 105-*a*.

In some examples, wireless communication system 200 may transmit data and control information via data or control channels based on one or more transmissions of signals between base station 105-*a* and UE 115-*a*. In some cases of wireless communication system 200, base station 105-*a*, or UE 115-*a*, or both may perform beam training based on received signals from the transmitting device (e.g., base station 105-*a* or UE 115-*a*). Base station 105-*a* may be a mmW base station that may transmit a beamformed transmission on an active beam to UE 115-*a*. A transmission from base station 105-*a* may be a beamformed or directional transmission directed towards UE 115-*a*. For example, base station 105-*a* may transmit signals to UE 115-*a* on DL transmission beams 205-*a* through 205-*d*.

Base station 105-*a* and UE 115-*a* may transmit messages using one or more physical channels or control channels. In one case, base station 105-*a* may transmit data or control information to UE 115-*a* via one or more synchronization blocks in a transmission synchronization slot of base station 105-*a*. Each synchronization block within the synchronization slot may be transmitted using a single OFDM symbol. Additionally, each synchronization block may be beamformed to a particular direction, e.g., a direction towards UE 115-*a*. Base station 105-*a* may use one OFDM symbol to transmit control information to UE 115 and switch transmission beams between OFDM symbols in the synchronization slot to transmit data to UE 115-*a*. In some cases, base station 105-*a* may divide an OFDM symbol (i.e., synchronization block) into multiple OFDM symbols.

In some cases, the sub-OFDM symbols may include PSS, or SSS, or PBCH information, or a combination thereof. The multiple OFDM symbols (e.g., that include the PSS, or SSS, or PBCH information), however, may not span the full bandwidth of the OFDM symbol. As a result, a portion of the OFDM symbol may go unused by base station 105. Base station 105-*a* may use the unused portion of the OFDM symbol to transmit control information to UE 115-*a*. Since a synchronization block may be associated with a single transmission beam, base station 105-*a* may be precluded from transmitting any data or control information using a different transmission beam for the same OFDM symbol. By using the unused portion of the OFDM symbol, base station 105-*a* may transmit both data and control information to UE 115-*a* using the same transmission beam of the synchronization block.

Base station 105-*a* may transmit DL signals in a beamformed manner and sweep through the angular coverage region for a geographic coverage area 110-*a*. Each DL transmission beam 205-*a* through 205-*d* may be transmitted in a beam sweeping operation in different directions so as to cover the coverage area of base station 105-*a*. In some examples, a synchronization slot may include one or more synchronization blocks. Each synchronization block may be associated with a transmission beam. For example, DL transmission beam 205-*a* may be transmitted in a first direction and associated with a first synchronization block, DL transmission beam 205-*b* may be transmitted in a second direction and associated with a second synchronization block, DL transmission beam 205-*c* may be transmitted in a third direction and associated with a third synchronization block, and DL transmission beam 205-*d* may be transmitted in a fourth direction and associated with a fourth synchronization block. Although wireless communication system 200 illustrates four DL transmission beams, i.e., DL transmission beams 205-*a* through 205-*d*, it is to be understood that fewer and/or more DL transmission beams may be transmitted.

The DL transmission beams may additionally be transmitted at variable beam widths, at different elevation angles, etc. In some examples, DL transmission beams 205-*a* through 205-*d* may include a beam index identified in a synchronization block in a synchronization slot, e.g., an indicator identifying the DL transmission beam. UE 115-*a* may, in some examples, identify a DL reception beam based on the beam index received and associated with the DL transmission beam (e.g., DL transmission beam 205-*b*).

Base station 105-*a* may, additionally or alternatively, transmit DL transmission beams 205-*a* through 205-*d* during different synchronization block periods of a synchronization slot. For example, base station 105-*a* may transmit DL transmission beam 205-*a* during a first synchronization block period (e.g., symbol 0), DL transmission beam 205-*b* during a second synchronization block period (e.g., symbol 1), DL transmission beam 205-*c* during a third synchronization block period (e.g., symbol 2), and DL transmission beam 205-*d* during a fourth synchronization block period (e.g., symbol 3). In some cases, base station 105-*a* may also transmit DL transmission beams 205-*a* through 205-*d* during other symbol periods of a synchronization slot. In some cases, UE 115-*a* may identify a DL reception beam based on the synchronization block period of the synchronization slot associated with the received DL transmission beam (e.g., DL transmission beam 205-*b*).

In some cases, wireless communication system 200 may provide UL control transmission during a RACH subframe. Base station 105-*a* may transmit beamformed signals (e.g., synchronization signals) on DL transmission beams 205-*a* through 205-*d*. UE 115-*a* may receive a beamformed signal (e.g., a synchronization signal) on one or more DL reception beams associated with UE 115-*a*. The DL transmission beams 205-*a* through 205-*d* associated with base station 105-*a* and the DL beam associated with UE 115-*a* used for DL communications may constitute a DL beam pair. In the case UE 115-*a* may receive multiple beamformed signals from base station 105-*a*, UE 115-*a* may identify and select a beamformed signal based on a metric. For example, UE 115-*a* may determine a received signal strength indicator (RSSI) of the multiple received beamformed signals and select a received beamformed signal based on the RSSI.

UE 115-*a* may also receive or identify a transmission schedule associated with base station 105-*a*. For example, UE 115-*a* may determine that a transmission beam is received from base station 105-*a* at a predetermined interval (e.g., subframe). UE 115-*a* may make this determination based on identifying a beam index associated with the transmission beam of base station 105-*a* and identifying a transmission interval associated with the transmission beam. UE 115-*a* may also identify when the base station 105 is listening for signals (e.g., mmW beamformed signals) from other wireless nodes (e.g., UEs) during a listening interval associated with the transmission beam.

UE 115-*a* may transmit a RACH signal to base station 105-*a* using a transmission beam (e.g., UL transmission beam) during a subframe associated with a transmission beam of base station 105-*a*. Base station 105-*a* may receive the RACH signal from UE 115-*a* during the subframe associated with the transmission beam. That is, base station 105-*a* may transmit a synchronization block using a DL transmission beam 205-*b* at a first time, UE 115-*a* may transmit a RACH signal to base station 105-*a* using an UL transmission beam at a second time associated with DL transmission beam 205-*b*. At the second time, the base station 105-*a* may be listening for transmission from UE 115-*a* using the same beam (i.e., DL transmission beam 205-*b*). The RACH signal may be beamformed in the direction of base station 105-*a*. UE 115-*a* may also transmit access information to base station 105-*a* based on the beamformed direction of the RACH. In some examples of wireless communication system 200, base station 105-*a* and UE 115-*a* may include one or more antenna arrays. An antenna array may include one or more antenna elements. A DL transmission beam may be transmitted from base station 105-*a* to UE 115-*a*. Subsequent to the DL transmission, one or more antenna elements of UE 115-*a* may receive the DL transmission beam. Alternatively or additionally, an UL transmission beam may be transmitted from UE 115-*a* to base station 105-*a*. As a result, one or more antenna elements of base station 105-*a* may receive the UL transmission beam.

Figure 3:
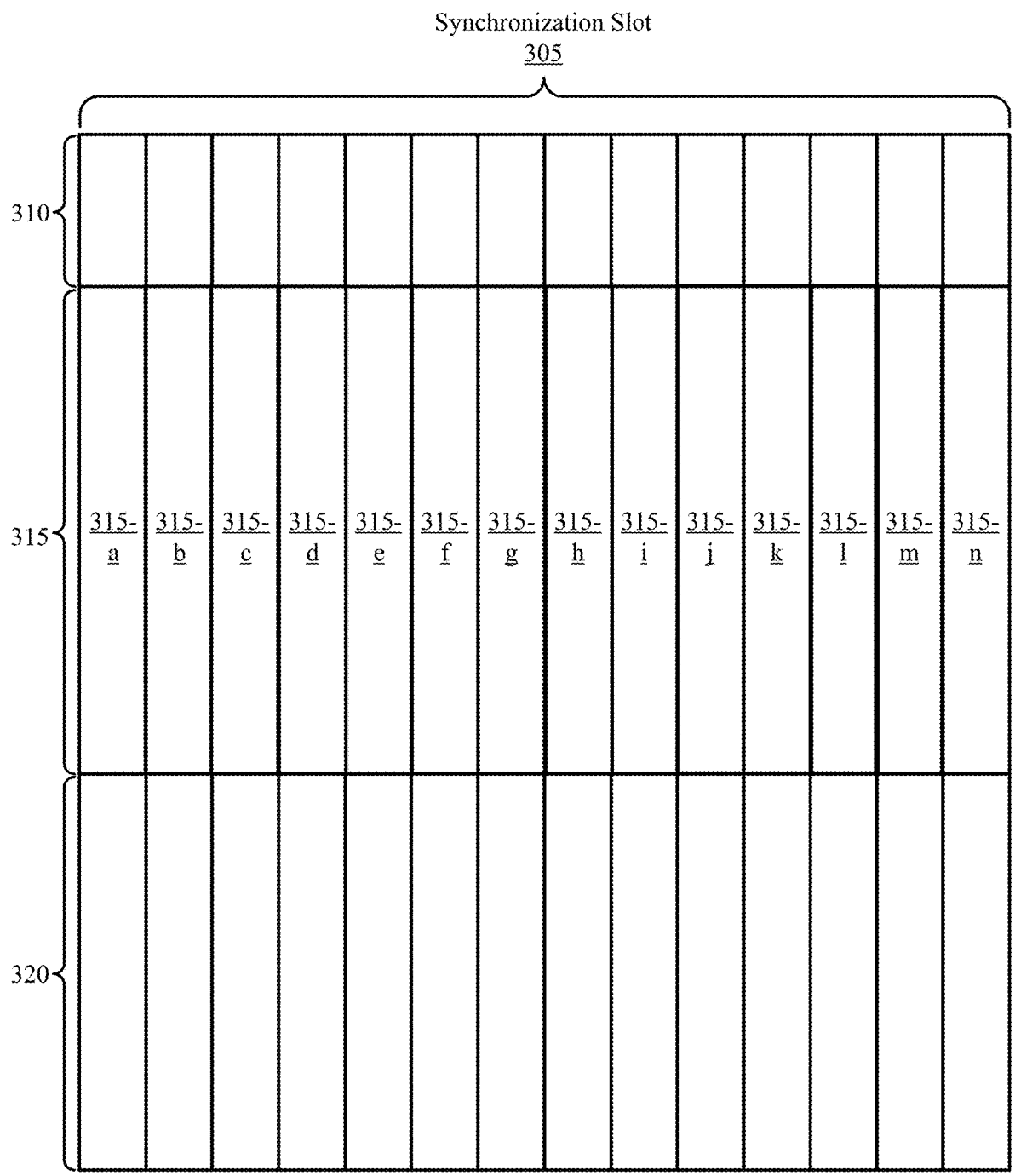
FIG. 3 illustrates an example of a synchronization burst structure that supports data and control channels in synchronization bursts for mmW new radio, in accordance with various aspects of the present disclosure.

FIG. 3 illustrates an example of a synchronization burst structure 300 that supports data and control channels in synchronization bursts for mmW new radio, in accordance with various aspects of the present disclosure. Synchronization burst structure 300 may implement aspects of wireless communication system 100 or 200 as described with reference to FIG. 1 or 2. In some examples, synchronization burst structure 300 may be utilized by base station 105. Base stations 105 may include a mmW base station and a service base station for UEs 115. Synchronization burst structure 300 may include a synchronization slot 305. Synchronization slot 305 may be preconfigured with data or control information for synchronizing wireless nodes. For example, a synchronization slot 305 may include information for synchronizing base station 105 with UE 115, as described with reference to FIG. 1.

In some examples, synchronization slot 305 may include synchronization blocks 315 (i.e., synchronization blocks 315-a through 315-n). Synchronization blocks 315 may occupy a predetermined bandwidth (e.g., first frequency portion of a bandwidth). Base station 105 may transmit data to UE 115 via one or more synchronization blocks 315 during the synchronization slot 305. Each synchronization block 315 within the synchronization slot 305 may be transmitted using a single OFDM symbol. Additionally, each synchronization block may be beamformed to a particular direction, e.g., a direction towards UE 115. In some cases, each synchronization block may be associated with a transmission beam.

For example, synchronization block 315-a may be transmitted in a first direction and associated with a first transmission beam, synchronization block 315-b may be transmitted in a second direction and associated with a second transmission beam, synchronization block 315-c may be transmitted in a third direction and associated with a third transmission beam, synchronization block 315-d may be transmitted in a fourth direction and associated with a fourth transmission beam, synchronization block 315-e may be transmitted in a fifth direction and associated with a fifth transmission beam, synchronization block 315-f may be transmitted in a sixth direction and associated with a sixth transmission beam, synchronization block 315-g may be transmitted in a seventh direction and associated with a seventh transmission beam, synchronization block 315-h may be transmitted in a eighth direction and associated with an eighth transmission beam, synchronization block 315-i may be transmitted in a ninth direction and associated with a ninth transmission beam, synchronization block 315-j may be transmitted in a tenth direction and associated with a tenth transmission beam, synchronization block 315-k may be transmitted in an eleventh direction and associated with an eleventh transmission beam, synchronization block 315-1 may be transmitted in a twelfth direction and associated with a twelfth transmission beam, synchronization block 315-m may be transmitted in a thirteenth direction and associated with a thirteenth transmission beam, and synchronization block 315-n may be transmitted in a fourteenth direction and associated with a fourteenth transmission beam.

Base station 105 may, additionally or alternatively, use one OFDM symbol to transmit control information to UE 115 and switch transmission beams between OFDM symbols in the synchronization slot 305 to transmit data to UE 115. In some cases, base station 105 may divide an OFDM symbol (i.e., synchronization block 315) into multiple OFDM symbols. For example, base station 105 may perform time-division multiplexing on synchronization blocks 315. As a result, synchronization slot 305 may include a predetermined number of OFDM symbols, e.g., fourteen OFDM symbols based at least in part on being TDM'ed.

In some cases, synchronization slot 305 may include a first control and data region 310 and a second control and data region 320. First control and data region 310 and second control and data region 320 may occupy a predetermined bandwidth (e.g., a second frequency portion of a bandwidth). In some cases, a portion of the OFDM symbol (e.g., first control and data region 310 and second control and data region 320) may go unused by base station 105. Base station 105 may use the unused portion of the OFDM symbol to transmit control information to UE 115. Since a synchronization block (e.g., 315-a) may be associated with a single transmission beam, base station 105 may be precluded from transmitting any data or control information using a different transmission beam for the same OFDM symbol. By using the unused portion of the OFDM symbol, base station 105 may transmit both data and control information to UE 115 using the same transmission beam of the synchronization blocks 315.

Figure 4A:
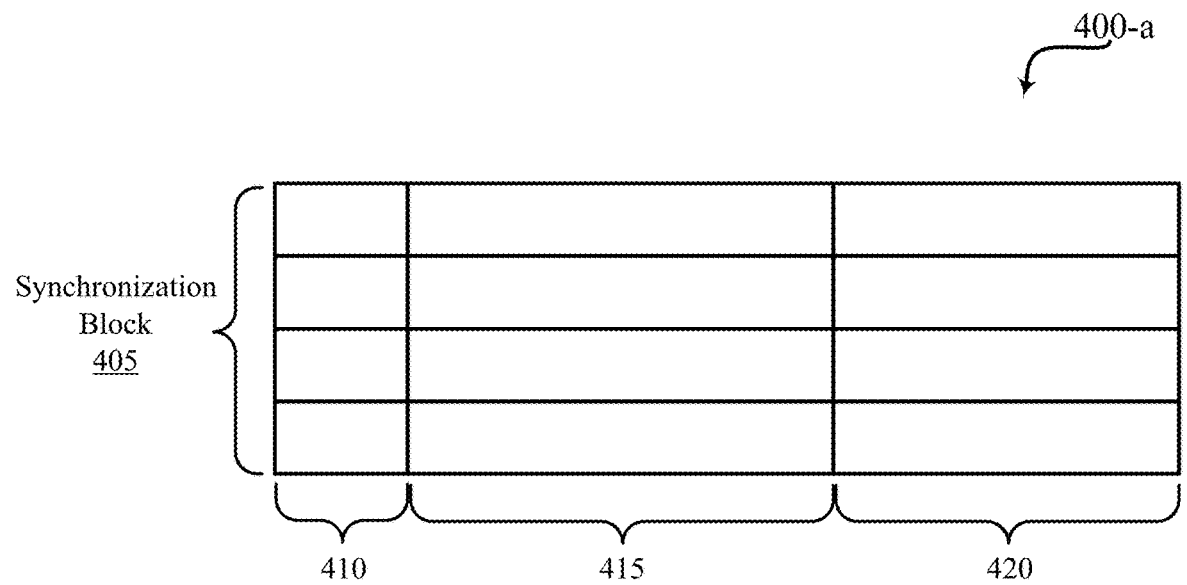
FIGS. 4A and 4B illustrate an example of a synchronization burst structure that supports data and control channels in synchronization bursts for mmW new radio, in accordance with various aspects of the present disclosure.
Figure 4B:
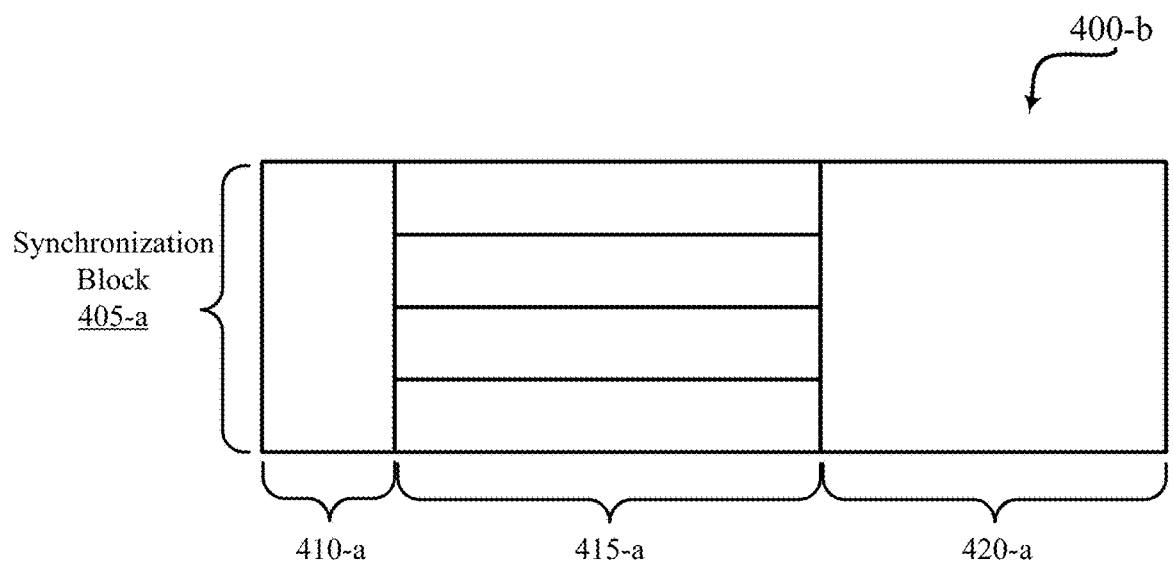

FIGS. 4A and 4B illustrate an example of a synchronization burst structure 400 that supports data and control channels in synchronization bursts for mmW new radio, in accordance with various aspects of the present disclosure. Synchronization burst structure 400 may implement aspects of wireless communication system 100 or 200 as described with reference to FIG. 1 or 2. In some examples, synchronization burst structure 400 may be utilized by base station 105. In some examples, synchronization burst structure 400 may be one or more aspects of synchronization burst structure 300 as described with reference to FIG. 3.

FIG. 4A illustrate an example of a synchronization burst structure 400-a that supports data and control channels in synchronization bursts for mmW new radio, in accordance with various aspects of the present disclosure. Synchronization burst structure 400-a may include synchronization block 405. Synchronization block 405 may be preconfigured with data or control information for synchronizing wireless nodes. For example, synchronization block 405 may include information for synchronizing base station 105 with UE 115, as described with reference to FIG. 1.

In some cases, the synchronization block 405 may be configured by applying a first OFDM symbol structure to the synchronization region 415 and a second OFDM symbol structure to the data region or the control region 410 and 420. In some cases, the first OFDM symbol structure is different from the second OFDM symbol structure. Synchronization block 405 may be divided into multiple OFDM symbols. For example, base station 105 may perform time-division multiplexing on synchronization block 405. As a result, synchronization block 405 may include a predetermined number of OFDM symbols, e.g., four OFDM symbols based at least in part on being TDM'ed.

Synchronization block 405 may include a synchronization region 415. The synchronization region 415 may be associated with a beamformed direction of UE 115. Synchronization region may be associated with a synchronization channel and include PSS, or SSS, or PBCH information, or a combination thereof. For example, a first region of synchronization region 415 may include PBCH information, a second region of synchronization region 415 may include PSS, a third region of synchronization region 415 may include SSS, and a fourth region of synchronization region 415 may include PBCH. In some cases, sub-regions of synchronization region 415 may be transmitted using a same transmission beam. Additionally, the sub-regions of synchronization region 415 may occupy a first frequency portion of a bandwidth associated with synchronization block 405.

In some examples, sub-regions of synchronization region 415 may be associated with different durations. For example, a first sub-region of synchronization region 415 may have a first symbol period, a second sub-region of synchronization region 415 may have a second symbol period, a third sub-region of synchronization region 415 may have a third symbol period, and a fourth sub-region of synchronization region 415 may have a fourth symbol period. In some cases, the first symbol period, the second symbol period, the third symbol period, and the fourth symbol period may span a duration of the synchronization block 405.

In some cases, synchronization block 405 may include data and control region 410 and data and control region 420. Based on the time-division multiplexing synchronization block 405, base station 105 may transmit control information in data and control region 410 and data and control region 420. For example, a first region of data and control region 410 or data and control region 420 may include a first set of data or control information, a second region of data and control region 410 or data and control region 420 may include a second set of data or control information, a third region of data and control region 410 or data and control region 420 may include a third set of data or control information, and a fourth region of data and control region 410 or data and control region 420 may include a fourth set of data or control information.

In some examples, the data and control region 410 or data and control region 420 may be transmitted concurrently with the synchronization region 415. The sub-regions data and control region 410 and 420 may occupy a second frequency portion of a bandwidth associated with synchronization block 405. Additionally, the data and control region 410 or data and control region 420 may be transmitted using the same transmission beam associated with the synchronization region 415.

FIG. 4B illustrates an example of a synchronization burst structure 400-b that supports data and control channels in synchronization bursts for mmW new radio, in accordance with various aspects of the present disclosure. Synchronization burst structure 400-a may include synchronization block 405-a. Synchronization block 405-a may be preconfigured with data or control information for synchronizing wireless nodes. For example, synchronization block 405-a may include information for synchronizing base station 105 with UE 115, as described with reference to FIG. 1.

In some examples, synchronization block 405-a may be divided into multiple OFDM symbols. For example, base station 105 may perform time-division multiplexing on synchronization block 405-a. As a result, synchronization block 405-a may include a predetermined number of OFDM symbols, e.g., four OFDM symbols based at least in part on being TDM'ed. Synchronization block 405-a may include a synchronization region 415-a. Synchronization region may include PSS, or SSS, or PBCH information, or a combination thereof. For example, a first region of synchronization region 415-a may include PBCH information, a second region of synchronization region 415-a may include PSS, a third region of synchronization region 415-a may include SSS, and a fourth region of synchronization region 415-a may include PBCH. In some cases, the sub-regions of synchronization region 415-a may be transmitted using a same transmission beam. Additionally, the sub-regions of synchronization region 415-a may occupy a first frequency portion of a bandwidth associated with synchronization block 405-a.

Synchronization block 405-a in some cases, may include a data and control region 410-a and data and control region 420-a that spans a duration of synchronization block 405-a. Base station 105 may transmit control information, in data and control region 410-a and data and control region 420-a, to UE 115. In some cases, the control information may include an uplink transmission grant for UE 115. In some examples, the data and control region 410-a or data and control region 420-a may be transmitted concurrently with the synchronization region 415-a. Data and control region 410-a or data and control region 420-a may occupy a second frequency portion of a bandwidth associated with synchronization block 405-a. Additionally, the data and control region 410-a or data and control region 420-a may be transmitted using the same transmission beam associated with the synchronization region 415-a.

Figure 5A:
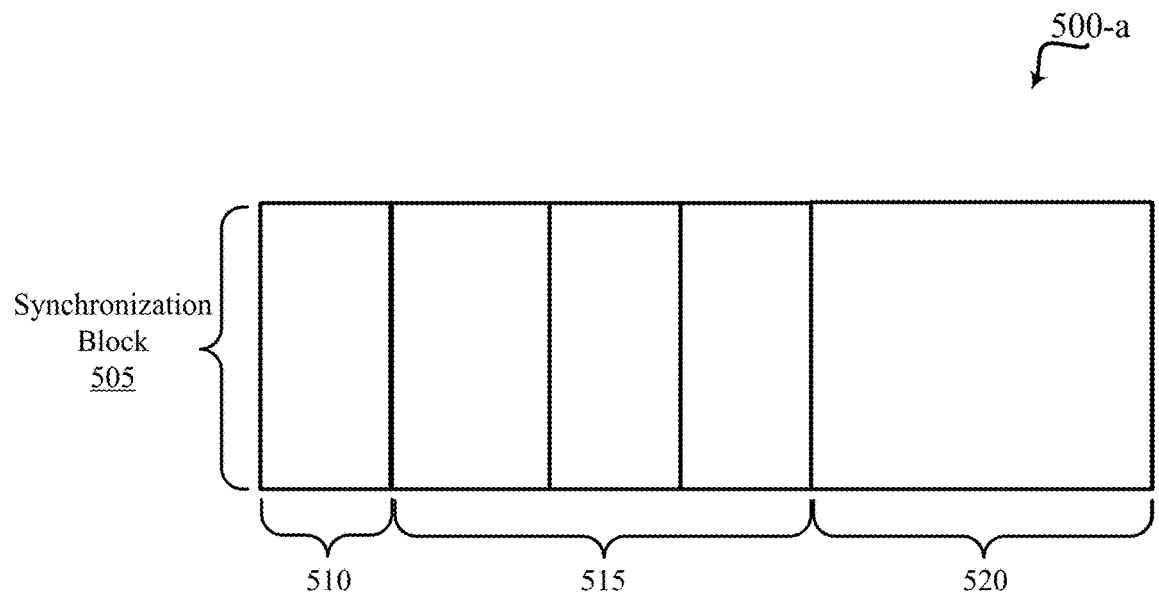
FIGS. 5A and 5B illustrate an example of a synchronization burst structure that supports data and control channels in synchronization bursts for mmW new radio, in accordance with various aspects of the present disclosure.
Figure 5B:
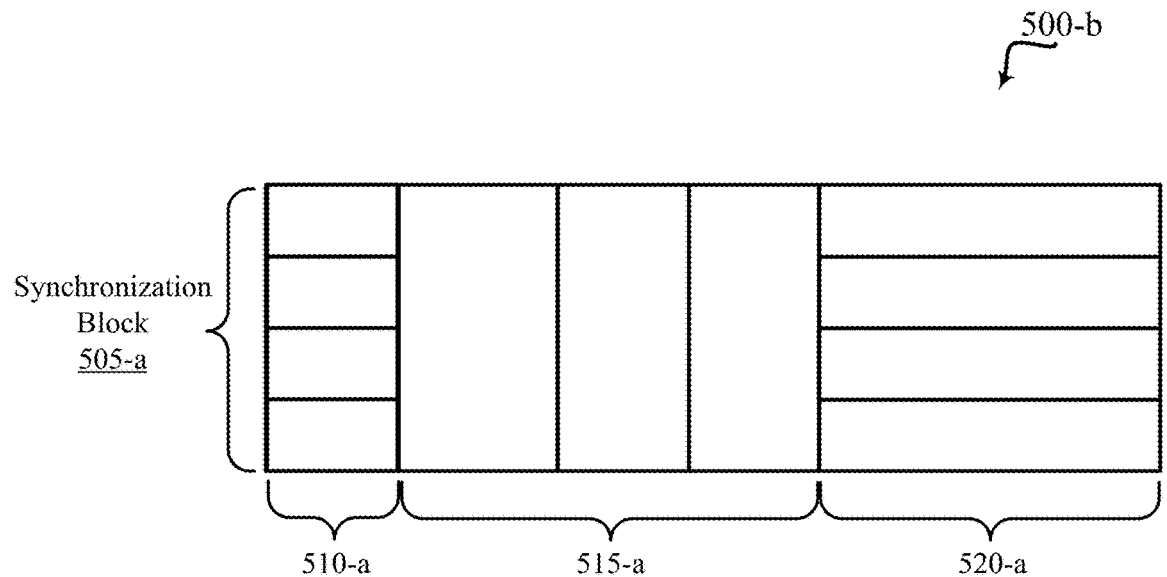

FIGS. 5A and 5B illustrate an example of a synchronization burst structure 500 that supports data and control channels in synchronization bursts for mmW new radio, in accordance with various aspects of the present disclosure. Synchronization burst structure 500 may implement aspects of wireless communication system 100 or 200 as described with reference to FIG. 1 or 2. In some examples, synchronization burst structure 500 may be utilized by base station 105. In some examples, synchronization burst structure 500 may be one or more aspects of synchronization burst structure 300 as described with reference to FIG. 3.

FIG. 5A illustrate an example of a synchronization burst structure 500-a that supports data and control channels in synchronization bursts for mmW new radio, in accordance with various aspects of the present disclosure. Synchronization burst structure 500-a may include synchronization block 505. Synchronization block 505 may be preconfigured with data or control information for synchronizing wireless nodes. For example, synchronization block 505 may include information for synchronizing base station 105 with UE 115, as described with reference to FIG. 1.

In some cases, the synchronization block 505 may be configured by applying a first OFDM symbol structure to the synchronization region 515 and a second OFDM symbol structure to the data region or the control region 510 and 520. In some cases, the first OFDM symbol structure is different from the second OFDM symbol structure. In some examples, base station 105 may perform frequency-division multiplexing on synchronization block 505. As a result, the synchronization block may not be divided into multiple OFDM symbols. In some cases, synchronization block 505 may include a data and control region 510 and data and control region 520. Data and control region 510 or data and control region 520 may include control information. The control information may include an uplink transmission grant for UE 115. In some cases, the data region and control region 510 or 520 may be assigned to each synchronization block 505 based on frequency-division multiplexing synchronization block 505. In some cases, the data and control region 510 or data and control region 520 may span a duration of synchronization region 515.

Synchronization block 505 may additionally include synchronization region 515. Synchronization region may include PSS, or SSS, or PBCH information, or a combination thereof. For example, a first region of synchronization region 515 may include PBCH information, a second region of synchronization region 515 may include PSS, a third region of synchronization region 515 may include SSS. In some cases, sub-regions of synchronization region 515 may be transmitted using a same transmission beam.

Additionally, the sub-regions of synchronization region 515 may occupy a first frequency portion of a bandwidth associated with synchronization block 505.

FIG. 5B illustrate an example of a synchronization burst structure 500-b that supports data and control channels in synchronization bursts for mmW new radio, in accordance with various aspects of the present disclosure. Synchronization burst structure 500-b may include synchronization block 505-a. Synchronization block 505-a may be preconfigured with data or control information for synchronizing wireless nodes. For example, synchronization block 505-a may include information for synchronizing base station 105 with UE 115, as described with reference to FIG. 1 In some examples, base station 105 may perform frequency-division multiplexing on synchronization block 505-*a*. As a result, the synchronization block is not split into multiple OFDM symbols. In some cases, synchronization block 505-*a* may include a data and control region 510-*a* and data and control region 520-*a*. Data and control region 510-*a* or data and control region 520-*a* may include control information. The control information may include an uplink transmission grant for UE 115.

Synchronization block 505-*a* may additionally include synchronization region 515-*a*. Synchronization region may include PSS, or SSS, or PBCH information, or a combination thereof. For example, a first region of synchronization region 515-*a* may include PBCH information, a second region of synchronization region 515-*a* may include PSS, a third region of synchronization region 515-*a* may include SSS. In some cases, sub-regions of synchronization region 515-*a* may be transmitted using a same transmission beam. Additionally, the sub-regions of synchronization region 515-*a* may occupy a first frequency portion of a bandwidth associated with synchronization block 505-*a*.

Figure 6:
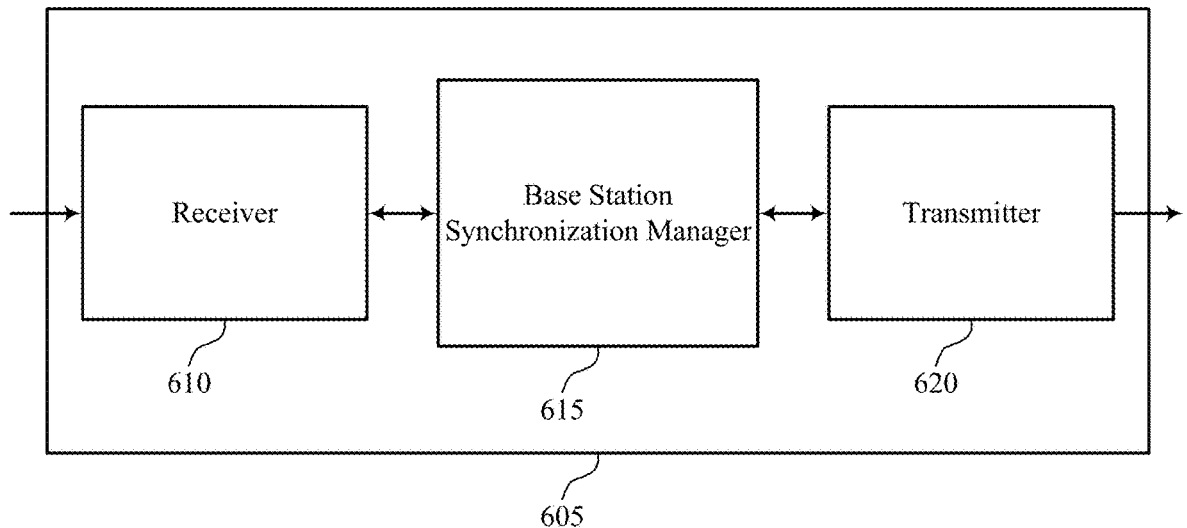
FIG. 6 illustrates a block diagram of a wireless device that supports data and control channels in synchronization bursts for mmW new radio, in accordance with various aspects of the present disclosure.

FIG. 6 illustrates a block diagram 600 of a wireless device 605 that supports data and control channels in synchronization bursts for mmW new radio, in accordance with various aspects of the present disclosure. Wireless device 605 may be an example of aspects of a base station 105 as described with reference to FIG. 1. Wireless device 605 may include receiver 610, base station synchronization manager 615, and transmitter 620. Wireless device 605 may also include a processor. Each of these components may be in communication with one another (e.g., via one or more buses).

Receiver 610 may receive information such as packets, user data, or control information associated with various information channels (e.g., control channels, data channels, and information related to data and control channels in synchronization bursts for mmW new radio, etc.). Information may be passed on to other components of the device. The receiver 610 may be an example of aspects of the transceiver 935 described with reference to FIG. 9.

Base station synchronization manager 615 may configure a synchronization slot associated with a plurality of synchronization blocks, configure a transmission of each synchronization block of the plurality of synchronization blocks based on the configured synchronization slot, assign a synchronization region to a first frequency portion associated with a transmission beam (e.g., mmW transmission beam) of each synchronization block, assign at least one of a data region or a control region to a second frequency portion associated with the transmission beam of each synchronization block, and transmit a synchronization signal during the synchronization region and transmitting at least one of data signal during the data region or control information during the control region to a wireless node.

Transmitter 620 may transmit signals generated by other components of the device. In some examples, the transmitter 620 may be collocated with a receiver 610 in a transceiver module. For example, the transmitter 620 may be an example of aspects of the transceiver 935 described with reference to FIG. 9. The transmitter 620 may include a single antenna, or it may include a set of antennas.

Figure 7:
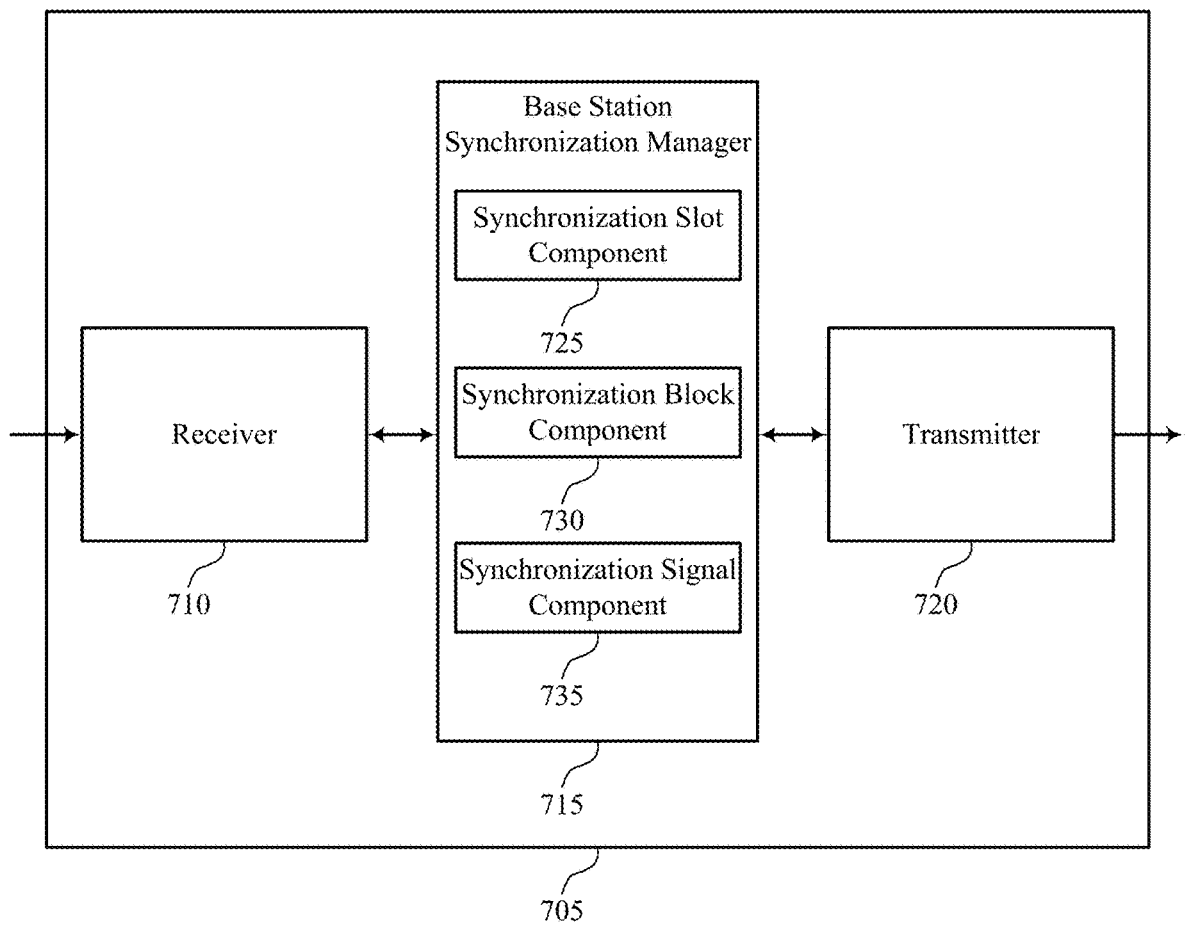
FIG. 7 illustrates a block diagram of a wireless device that supports data and control channels in synchronization bursts for mmW new radio, in accordance with various aspects of the present disclosure.

FIG. 7 illustrates a block diagram 700 of a wireless device 705 that supports data and control channels in synchronization bursts for mmW new radio, in accordance with various aspects of the present disclosure. Wireless device 705 may be an example of aspects of a wireless device 605 or a base station 105 as described with reference to FIGS. 1 and 6. Wireless device 705 may include receiver 710, base station synchronization manager 715, and transmitter 720. Wireless device 705 may also include a processor. Each of these components may be in communication with one another (e.g., via one or more buses).

Receiver 710 may receive information such as packets, user data, or control information associated with various information channels (e.g., control channels, data channels, and information related to data and control channels in synchronization bursts for mmW new radio, etc.). Information may be passed on to other components of the device. The receiver 710 may be an example of aspects of the transceiver 935 described with reference to FIG. 9.

Base station synchronization manager 715 may be an example of aspects of the base station synchronization manager 615 described with reference to FIG. 6. In some cases, base station synchronization manager 715 may also include synchronization slot component 725, synchronization block component 730, and synchronization signal component 735. In some examples, synchronization slot component 725 may configure a synchronization slot associated with a plurality of synchronization blocks and configure a transmission of each synchronization block of the plurality of synchronization blocks based on the configured synchronization slot.

Synchronization block component 730 may assign a synchronization region to a first frequency portion associated with a transmission beam of each synchronization block. In some cases, synchronization block component 730 may assign at least one of a data region or a control region to a second frequency portion associated with the transmission beam of each synchronization block. Synchronization block component 730 may configure the synchronization block based on applying a same OFDM symbol structure for the data region or the control region and the synchronization region.

Additionally or alternatively, synchronization block component 730 may configure the synchronization block based on applying a first OFDM symbol structure to the synchronization region and a second OFDM symbol structure to the data region or the control region. In some cases, the first OFDM symbol structure may be different from the second OFDM symbol structure. In some examples, synchronization block component 730 may configure the set of synchronization blocks based on frequency-division multiplexing (FDM), and assign at least one of the data region or the control region to each synchronization block based on the configuring.

In some cases, the data region or the control region spans a duration of the synchronization region. In some cases, the first frequency portion and the second frequency portion of synchronization block may be associated with a same transmission beam. In some cases, the synchronization region may be associated with a beamformed direction of the wireless node.

Synchronization signal component 735 may transmit a synchronization signal during the synchronization region and transmitting at least one of data signal during the data region or control information during the control region to a wireless node. Additionally or alternatively, synchronization signal component 735 may transmit the synchronization signal and at least one of the data or the control information to the wireless node using a same transmission beam. In some cases, synchronization signal component 735 may transmit at least one of data signal during the data region or the control information during the control region to a wireless node. In some examples, synchronization signal component 735 may transmit the synchronization signal to the wireless node based on a periodic interval. In some cases, the control information may include an uplink transmission grant for the wireless node.

Transmitter 720 may transmit signals generated by other components of the device. In some examples, the transmitter 720 may be collocated with a receiver 710 in a transceiver module. For example, the transmitter 720 may be an example of aspects of the transceiver 935 described with reference to FIG. 9. The transmitter 720 may include a single antenna, or it may include a set of antennas.

Figure 8:
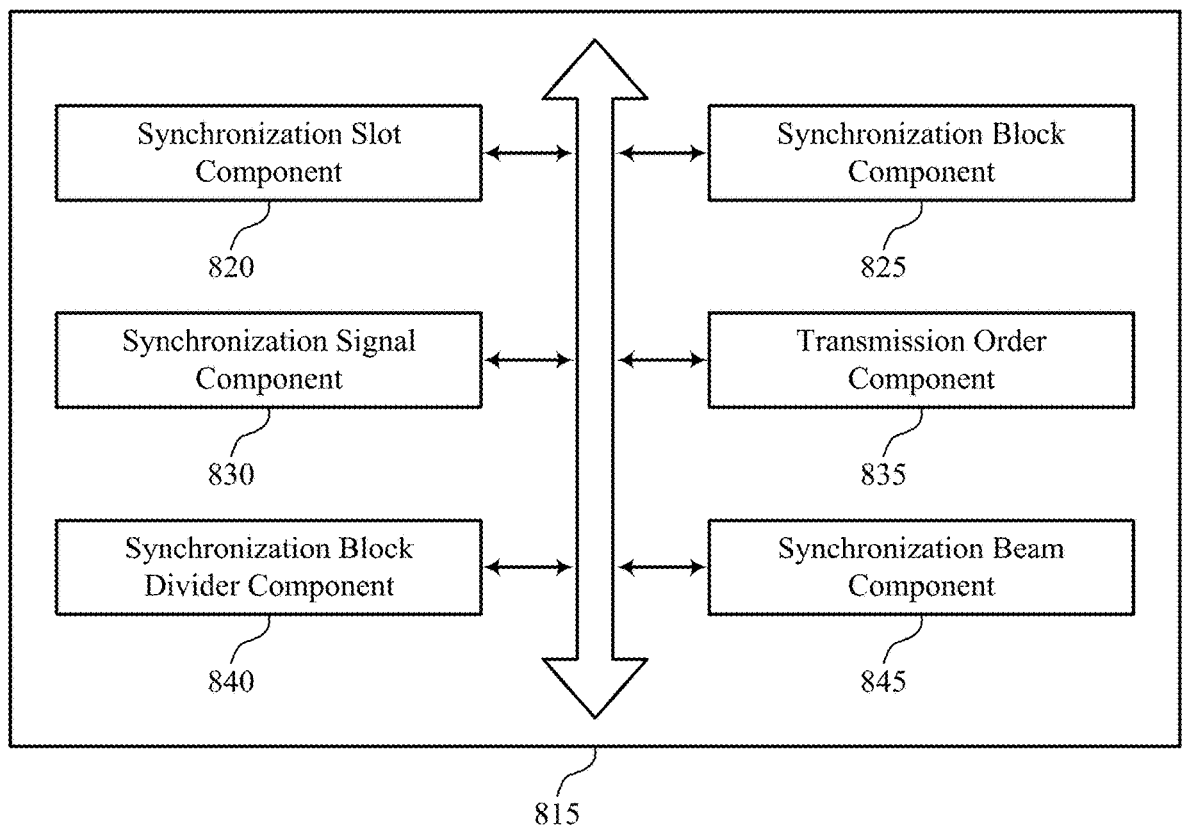
FIG. 8 illustrates a block diagram of a base station synchronization manager that supports data and control channels in synchronization bursts for mmW new radio, in accordance with various aspects of the present disclosure.

FIG. 8 illustrates a block diagram 800 of a base station synchronization manager 815 that supports data and control channels in synchronization bursts for mmW new radio, in accordance with various aspects of the present disclosure. The base station synchronization manager 815 may be an example of aspects of a base station synchronization manager 615 or a base station synchronization manager 715, described with reference to FIGS. 6 and 7. The base station synchronization manager 815 may include synchronization slot component 820, synchronization block component 825, synchronization signal component 830, transmission order component 835, synchronization block divider component 840, and synchronization beam component 845. Each of these modules may communicate, directly or indirectly, with one another (e.g., via one or more buses).

Synchronization slot component 820 may configure a synchronization slot associated with a plurality of synchronization blocks and configure a transmission of each synchronization block of the plurality of synchronization blocks based on the configured synchronization slot.

Synchronization block component 825 may assign a synchronization region to a first frequency portion associated with a transmission beam of each synchronization block. In some examples, synchronization block component 825 may assign at least one of a data region or a control region to a second frequency portion associated with the transmission beam of each synchronization block. In some cases, synchronization component 828 may configure the plurality of synchronization blocks based on applying a same OFDM symbol structure for the data region or the control region and the synchronization region.

In some examples, synchronization block component 825 may configure the plurality of synchronization blocks based on applying a first OFDM symbol structure to the synchronization region and a second OFDM symbol structure to the data region or the control region. In some cases, the first OFDM symbol structure may be different from the second OFDM symbol structure.

Additionally or alternatively, synchronization block component 825 may configure the plurality of synchronization blocks based on frequency-division multiplexing (FDM), and assign at least one of the data region or the control region to each synchronization block based on the configuring. In some cases, the data region or the control region spans a duration of the synchronization region. In some examples, the first frequency portion and the second frequency portion of synchronization block may be associated with a same transmission beam (e.g., a DL transmission beam). In some cases, the synchronization region may be associated with a beamformed direction of the wireless node (e.g., a DL transmission beam of base station 105 and a DL reception beam of UE 115).

Synchronization signal component 830 may transmit a synchronization signal during the synchronization region and transmit at least one of data signal during the data region or control information during the control region to a wireless node. In some cases, synchronization signal component 830 may transmit a synchronization signal and at least one of the data or the control information to the wireless node using a same transmission beam. Additionally or alternatively, synchronization signal component 830 may transmit at least one of data signal during the data region or the control information during the control region to a wireless node. In some cases, synchronization signal component 830 may transmit the synchronization signal to the wireless node based on a periodic interval. In some cases, the control information may include an uplink transmission grant for the wireless node.

Transmission order component 835 may identify a transmission order associated with the synchronization slot. In some examples, transmission order component 835 may transmit each synchronization block based on a transmission beam. Additionally, transmission order component 835 may transmit each synchronization block based on the transmission order. In some examples, each synchronization block may be transmitted at a different time based on the transmission order.

Synchronization block divider component 840 may divide at least one synchronization block of the plurality of synchronization blocks into multiple orthogonal frequency division multiplexing (OFDM) symbols based on time-division multiplexing (TDM). In some cases, dividing the at least one synchronization block into multiple OFDM symbols based on the TDM may include transmitting a synchronization channel using the multiple OFDM symbols. In some cases, the synchronization channel may include at least one of a physical broadcast channel (PBCH), or a primary synchronization signal (PSS), or a secondary synchronization signal (SSS), or a combination thereof.

Synchronization beam component 845 may identify a beam pair associated with the wireless node and assign the beam pair to the synchronization region. In some cases, the wireless node may be preconfigured with an uplink transmission beam and a downlink reception beam.

Figure 9:
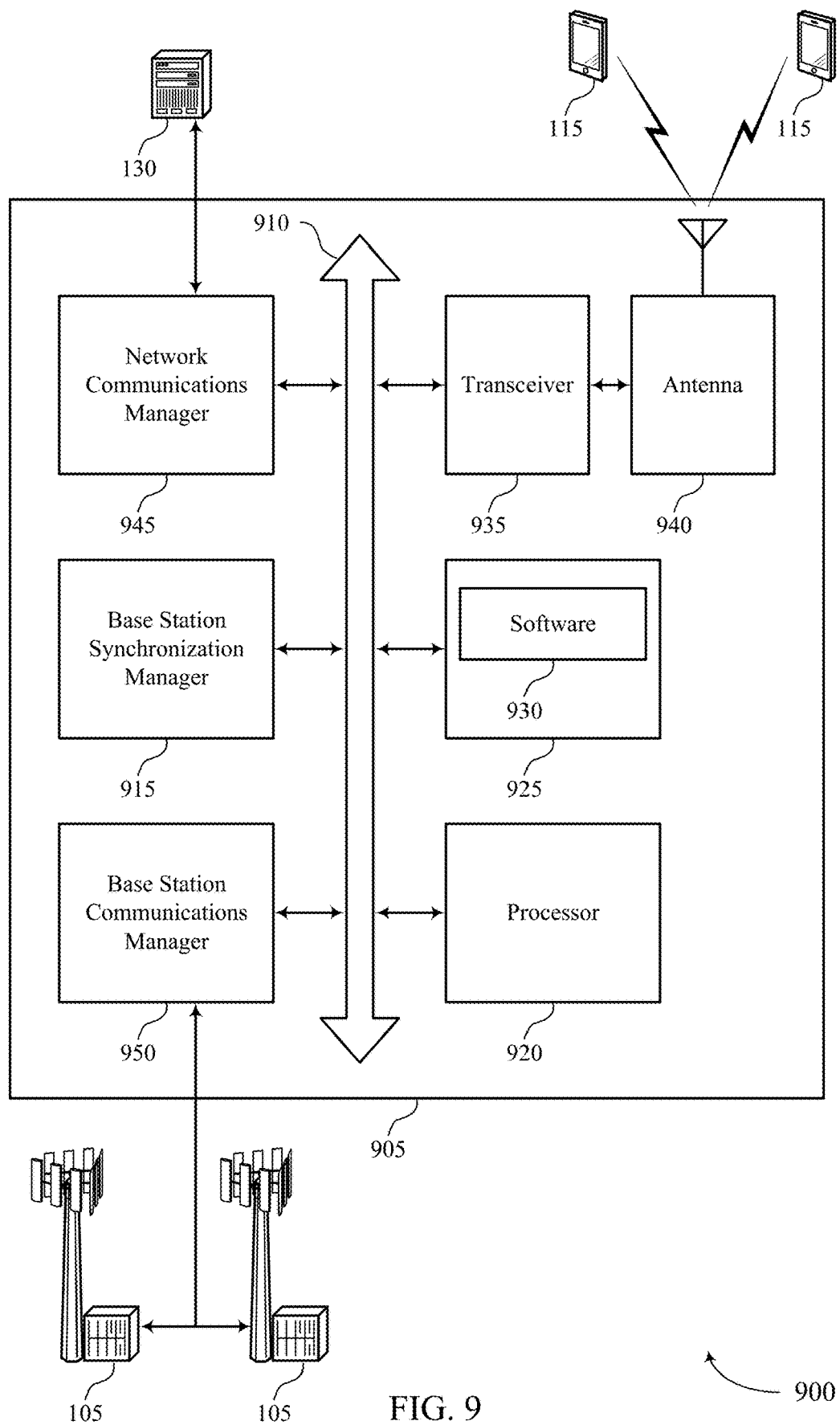
FIG. 9 illustrates a diagram of a system including a device that supports data and control channels in synchronization bursts for mmW new radio, in accordance with various aspects of the present disclosure.

FIG. 9 illustrates a diagram of a system 900 including a device 905 that supports data and control channels in synchronization bursts for mmW new radio, in accordance with various aspects of the present disclosure. Device 905 may be an example of or include the components of wireless device 605, wireless device 705, or a base station 105 as described above, e.g., with reference to FIGS. 1, 6 and 7. Device 905 may include components for bi-directional voice and data communications including components for transmitting and receiving communications, including base station synchronization manager 915, processor 920, memory 925, software 930, transceiver 935, antenna 940, network communications manager 945, and base station communications manager 950. These components may be in electronic communication via one or more busses (e.g., bus 910). Device 905 may communicate wirelessly with one or more user equipment (UE)s 115.

Processor 920 may include an intelligent hardware device, (e.g., a general-purpose processor, a digital signal processor (DSP), a central processing unit (CPU), a microcontroller, an application-specific integrated circuit (ASIC), an field-programmable gate array (FPGA), a programmable logic device, a discrete gate or transistor logic component, a discrete hardware component, or any combination thereof). In some cases, processor 920 may be configured to operate a memory array using a memory controller. In other cases, a memory controller may be integrated into processor 920. Processor 920 may be configured to execute computer-readable instructions stored in a memory to perform various functions (e.g., functions or tasks supporting supports data and control channels in synchronization bursts for mmW new radio).

Memory 925 may include random access memory (RAM) and read only memory (ROM). The memory 925 may store computer-readable, computer-executable software 930 including instructions that, when executed, cause the processor to perform various functions described herein. In some cases, the memory 925 may contain, among other things, a basic input/output system (BIOS) which may control basic hardware and/or software operation such as the interaction with peripheral components or devices.

Software 930 may include code to implement aspects of the present disclosure, including code to support supports data and control channels in synchronization bursts for mmW new radio. Software 930 may be stored in a non-transitory computer-readable medium such as system memory or other memory. In some cases, the software 930 may not be directly executable by the processor but may cause a computer (e.g., when compiled and executed) to perform functions described herein.

Transceiver 935 may communicate bi-directionally, via one or more antennas, wired, or wireless links as described above. For example, the transceiver 935 may represent a wireless transceiver and may communicate bi-directionally with another wireless transceiver. The transceiver 935 may also include a modem to modulate the packets and provide the modulated packets to the antennas for transmission, and to demodulate packets received from the antennas. In some cases, the wireless device may include a single antenna 940. However, in some cases the device may have more than one antenna 940, which may be capable of concurrently transmitting or receiving multiple wireless transmissions.

Network communications manager 945 may manage communications with the core network (e.g., via one or more wired backhaul links). For example, the network communications manager 945 may manage the transfer of data communications for client devices, such as one or more UEs 115. Base station communications manager 950 may manage communications with other base station 105, and may include a controller or scheduler for controlling communications with UEs 115 in cooperation with other base stations 105. For example, the base station communications manager 950 may coordinate scheduling for transmissions to UEs 115 for various interference mitigation techniques such as beamforming or joint transmission. In some examples, base station communications manager 950 may provide an X2 interface within an Long Term Evolution (LTE)/LTE-A wireless communication network technology to provide communication between base stations 105.

Figure 10:
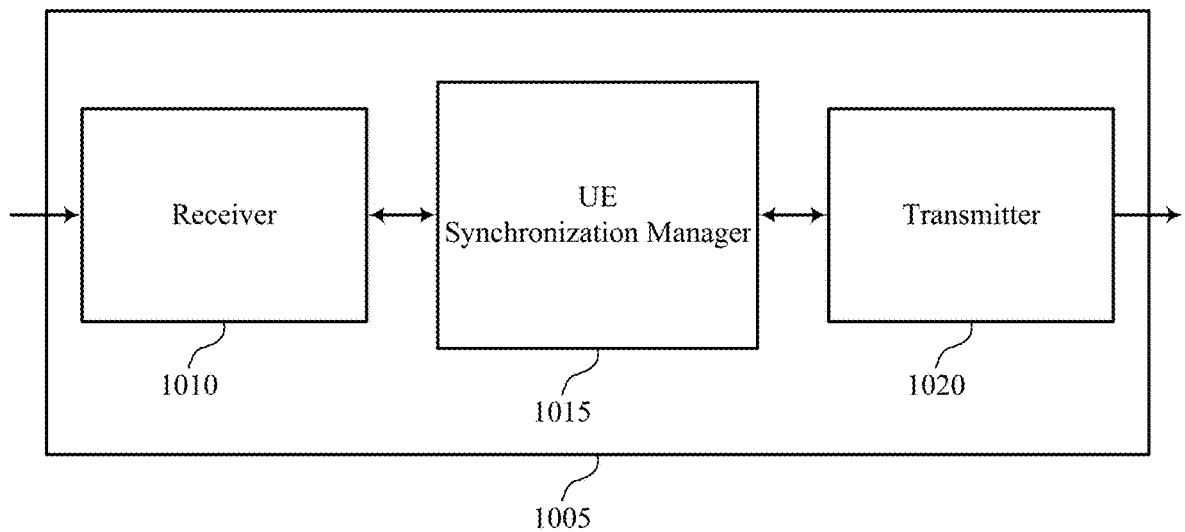
FIG. 10 illustrates a block diagram of a wireless device that supports data and control channels in synchronization bursts for mmW new radio, in accordance with various aspects of the present disclosure.

FIG. 10 illustrates a block diagram 1000 of a wireless device 1005 that supports data and control channels in synchronization bursts for mmW new radio, in accordance with various aspects of the present disclosure. Wireless device 1005 may be an example of aspects of a UE 115 as described with reference to FIG. 1. Wireless device 1005 may include receiver 1010, UE synchronization manager 1015, and transmitter 1020. Wireless device 1005 may also include a processor. Each of these components may be in communication with one another (e.g., via one or more buses).

Receiver 1010 may receive information such as packets, user data, or control information associated with various information channels (e.g., control channels, data channels, and information related to data and control channels in synchronization bursts for mmW new radio, etc.). Information may be passed on to other components of the device. The receiver 1010 may be an example of aspects of the transceiver 1335 described with reference to FIG. 13.

UE synchronization manager 1015 may monitor a synchronization channel associated with a synchronization block of a synchronization slot and receive a synchronization signal associated with a first frequency portion associated with a downlink reception beam of the synchronization slot and at least one of data or control information associated with a second frequency portion associated with the downlink reception beam of the synchronization block during the synchronization slot.

Transmitter 1020 may transmit signals generated by other components of the device. In some examples, the transmitter 1020 may be collocated with a receiver 1010 in a transceiver module. For example, the transmitter 1020 may be an example of aspects of the transceiver 1335 described with reference to FIG. 13. The transmitter 1020 may include a single antenna, or it may include a set of antennas.

Figure 11:
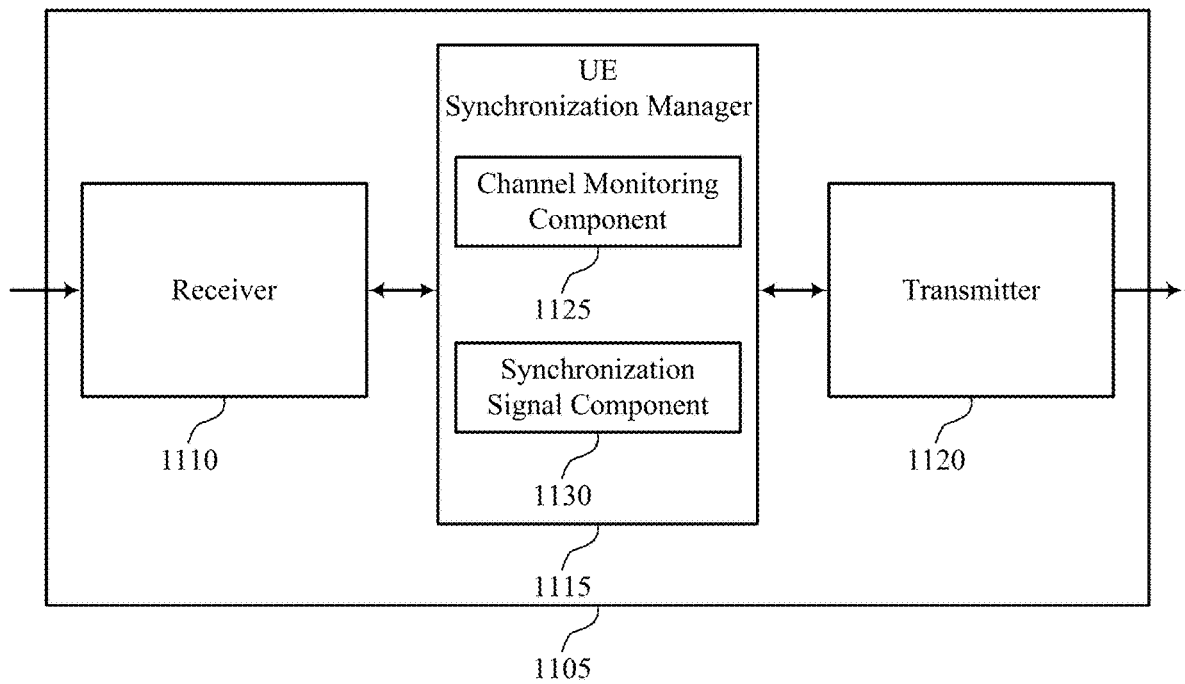
FIG. 11 illustrates a block diagram of a wireless device that supports data and control channels in synchronization bursts for mmW new radio, in accordance with various aspects of the present disclosure.

FIG. 11 illustrates a block diagram 1100 of a wireless device 1105 that supports data and control channels in synchronization bursts for mmW new radio, in accordance with various aspects of the present disclosure. Wireless device 1105 may be an example of aspects of a wireless device 1005 or a UE 115 as described with reference to FIGS. 1 and 10. Wireless device 1005 may include receiver 1010, UE synchronization manager 1015, and transmitter 1020. Wireless device 1005 may also include a processor. Each of these components may be in communication with one another (e.g., via one or more buses).

Receiver 1110 may receive information such as packets, user data, or control information associated with various information channels (e.g., control channels, data channels, and information related to data and control channels in synchronization bursts for mmW new radio, etc.). Information may be passed on to other components of the device. The receiver 1110 may be an example of aspects of the transceiver 1335 described with reference to FIG. 13.

UE synchronization manager 1115 may also include channel monitoring component 1125 and synchronization signal component 1130. In some cases, channel monitoring component 1125 may monitor a synchronization channel associated with a synchronization block of a synchronization slot. Synchronization signal component 1130 may receive a synchronization signal associated with a first frequency portion associated with a downlink reception beam of the synchronization slot and at least one of data or control information associated with a second frequency portion associated with the downlink reception beam of the synchronization block during the synchronization slot.

Transmitter 1120 may transmit signals generated by other components of the device. In some examples, the transmitter 1120 may be collocated with a receiver 1110 in a transceiver module. For example, the transmitter 1120 may be an example of aspects of the transceiver 1335 described with reference to FIG. 13. The transmitter 1120 may include a single antenna, or it may include a set of antennas.

Figure 12:
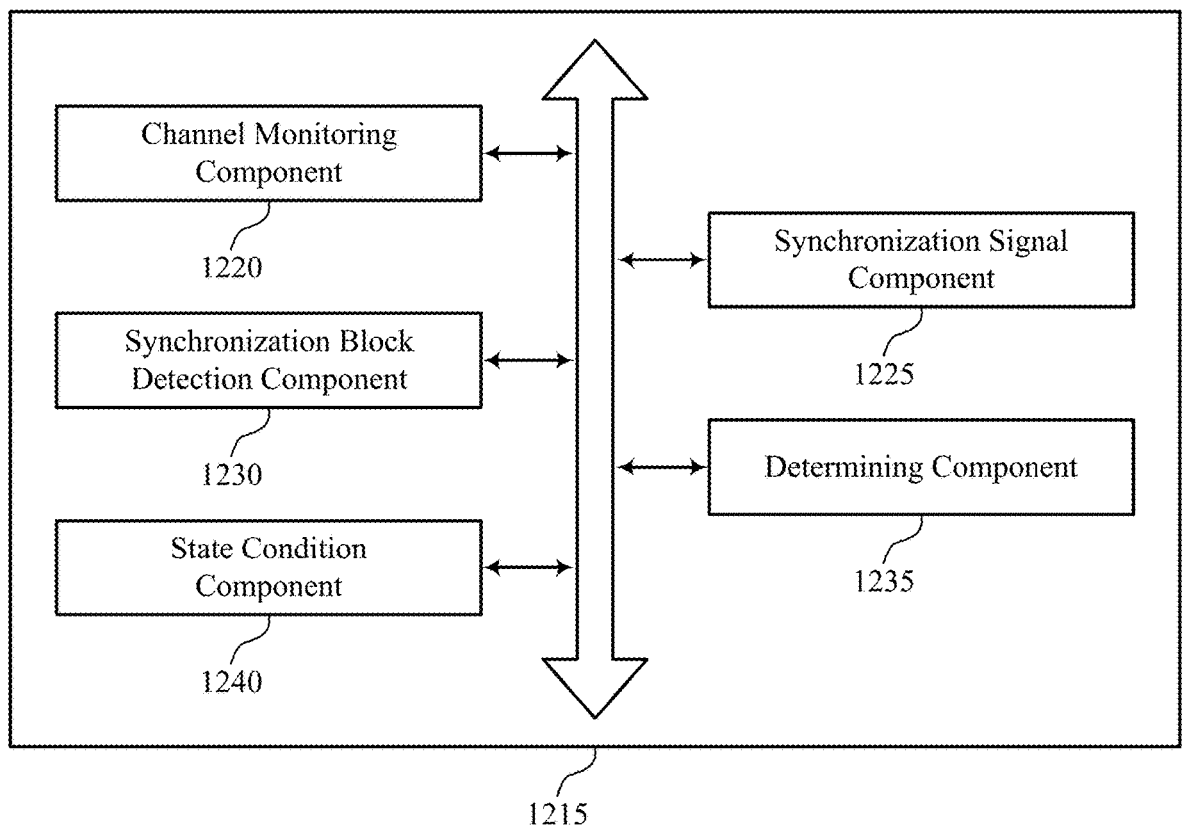
FIG. 12 illustrates a block diagram of a UE synchronization manager that supports data and control channels in synchronization bursts for mmW new radio, in accordance with various aspects of the present disclosure.

FIG. 12 illustrates a block diagram 1200 of a UE synchronization manager 1215 that supports data and control channels in synchronization bursts for mmW new radio, in accordance with various aspects of the present disclosure. The UE synchronization manager 1215 may be an example of aspects of a UE synchronization manager 1215 described with reference to FIGS. 10 and 11. The UE synchronization manager 1215 may include channel monitoring component 1220, synchronization signal component 1225, synchronization block detection component 1230, determining component 1235, and state condition component 1240. Each of these modules may communicate, directly or indirectly, with one another (e.g., via one or more buses).

In some examples, channel monitoring component 1220 may monitor a synchronization channel associated with a synchronization block of a synchronization slot. Synchronization signal component 1225 may receive a synchronization signal associated with a first frequency portion associated with a downlink reception beam of the synchronization slot and at least one of data or control information associated with a second frequency portion associated with the downlink reception beam of the synchronization block during the synchronization slot.

Synchronization block detection component 1230, in some examples, may configure to detect at least one of data or control information associated with the synchronization block. Determining component 1235 may determine an absence of at least one of the data or control information during the synchronization block. State condition component 1240 may transition into a micro-sleep state based on the determining.

Figure 13:
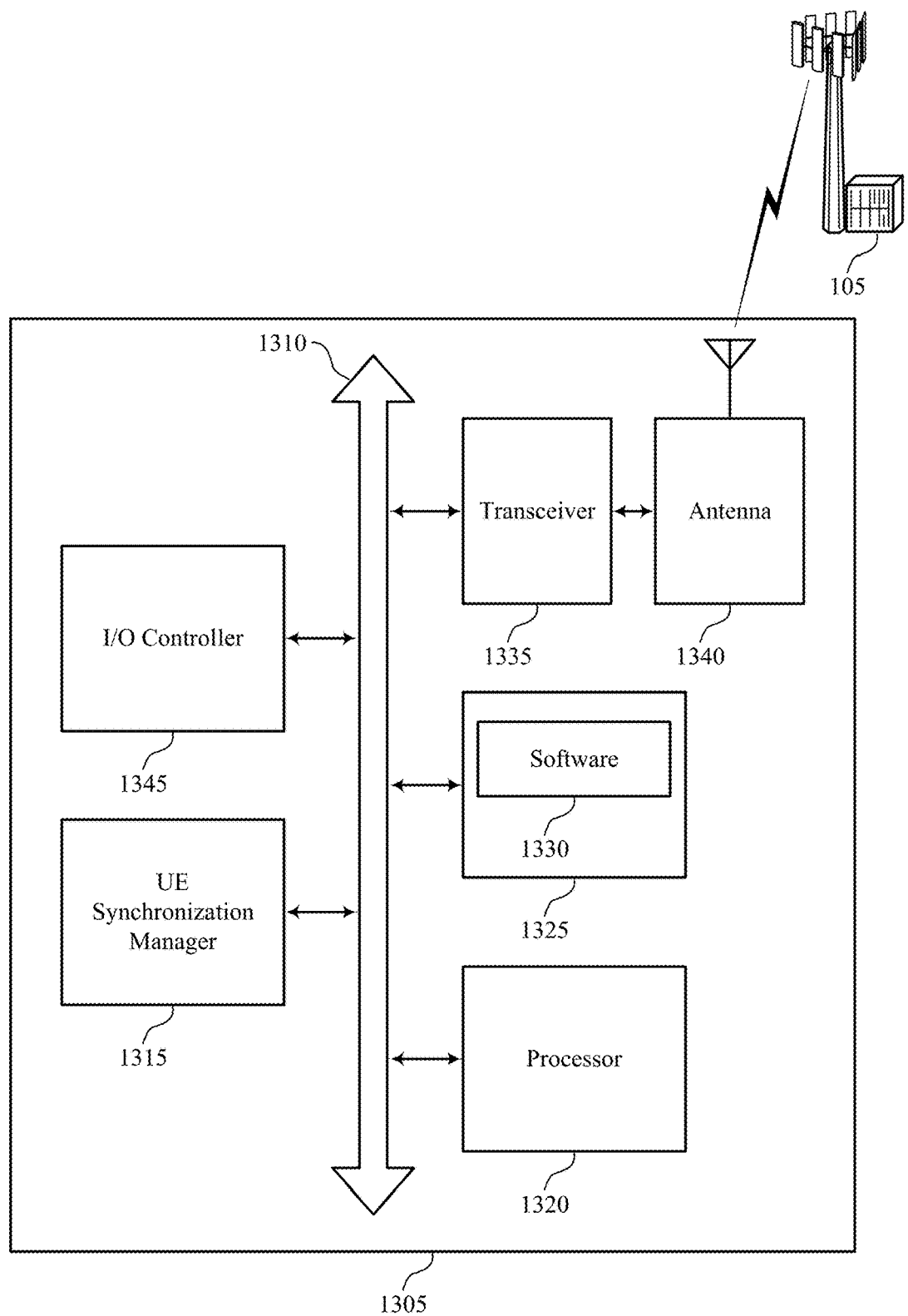
FIG. 13 illustrates a diagram of a system including a device that supports data and control channels in synchronization bursts for mmW new radio, in accordance with various aspects of the present disclosure.

FIG. 13 illustrates a diagram of a system 1300 including a device 1305 that supports data and control channels in synchronization bursts for mmW new radio, in accordance with various aspects of the present disclosure. Device 1305 may be an example of or include the components of UE 115 as described above, e.g., with reference to FIG. 1. Device 1305 may include components for bi-directional voice and data communications including components for transmitting and receiving communications, including UE synchronization manager 1315, processor 1320, memory 1325, software 1330, transceiver 1335, antenna 1340, and I/O controller 1345. These components may be in electronic communication via one or more busses (e.g., bus 1310). Device 1305 may communicate wirelessly with one or more base stations 105.

Processor 1320 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, processor 1320 may be configured to operate a memory array using a memory controller. In other cases, a memory controller may be integrated into processor 1320. Processor 1320 may be configured to execute computer-readable instructions stored in a memory to perform various functions (e.g., functions or tasks supporting data and control channels in synchronization bursts for mmW new radio).

Memory 1325 may include RAM and ROM. The memory 1325 may store computer-readable, computer-executable software 1330 including instructions that, when executed, cause the processor to perform various functions described herein. In some cases, the memory 1325 may contain, among other things, a BIOS which may control basic hardware and/or software operation such as the interaction with peripheral components or devices.

Software 1330 may include code to implement aspects of the present disclosure, including code to support data and control channels in synchronization bursts for mmW new radio. Software 1330 may be stored in a non-transitory computer-readable medium such as system memory or other memory. In some cases, the software 1330 may not be directly executable by the processor but may cause a computer (e.g., when compiled and executed) to perform functions described herein.

Transceiver 1335 may communicate bi-directionally, via one or more antennas, wired, or wireless links as described above. For example, the transceiver 1335 may represent a wireless transceiver and may communicate bi-directionally with another wireless transceiver. The transceiver 1335 may also include a modem to modulate the packets and provide the modulated packets to the antennas for transmission, and to demodulate packets received from the antennas.

In some cases, the wireless device may include a single antenna 1340. However, in some cases the device may have more than one antenna 1340, which may be capable of concurrently transmitting or receiving multiple wireless transmissions.

I/O controller 1345 may manage input and output signals for device 1305. I/O controller 1345 may also manage peripherals not integrated into device 1305. In some cases, I/O controller 1345 may represent a physical connection or port to an external peripheral. In some cases, I/O controller 1345 may utilize an operating system such as iOS®, ANDROID®, MS-DOS®, MS-WINDOWS®, OS/2®, UNIX®, LINUX®, or another known operating system.

Figure 14:
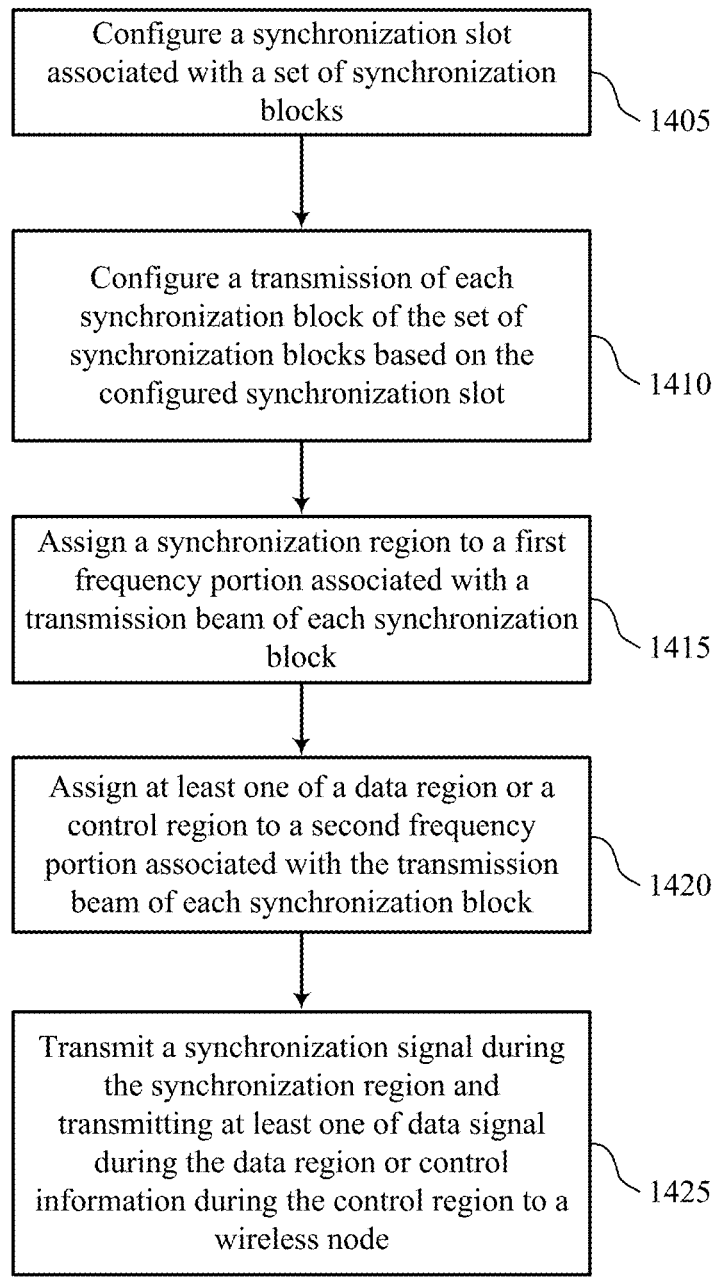
FIGS. 14 through 18 illustrate methods that supports data and control channels in synchronization bursts for mmW new radio, in accordance with various aspects of the present disclosure.

FIG. 14 illustrates a flowchart illustrating a method 1400 that supports data and control channels in synchronization bursts for mmW new radio, in accordance with various aspects of the present disclosure. The operations of method 1400 may be implemented by base station 105 or its components as described herein. For example, the operations of method 1400 may be performed by a base station synchronization manager as described with reference to FIGS. 6 through 9. In some examples, base station 105 may execute a set of codes to control the functional elements of the device to perform the functions described below. Additionally or alternatively, base station 105 may perform aspects the functions described below using special-purpose hardware.

At block 1405, base station 105 may configure a synchronization slot associated with a plurality of synchronization blocks. In certain examples, aspects of the operations of block 1405 may be performed by a synchronization slot component as described with reference to FIGS. 7 and 8.

At block 1410, base station 105 may configure a transmission of each synchronization block of the plurality of synchronization blocks based on the configured synchronization slot. In certain examples, aspects of the operations of block 1410 may be performed by a synchronization slot component as described with reference to FIGS. 7 and 8.

At block 1415, base station 105 may assign a synchronization region to a first frequency portion associated with a transmission beam of each synchronization block. In certain examples, aspects of the operations of block 1415 may be performed by a synchronization block component as described with reference to FIGS. 7 and 8.

At block 1420, base station 105 may assign at least one of a data region or a control region to a second frequency portion associated with the transmission beam of each synchronization block. In certain examples, aspects of the operations of block 1420 may be performed by a synchronization block component as described with reference to FIGS. 7 and 8.

At block 1425, base station 105 may transmit a synchronization signal during the synchronization region and transmitting at least one of data signal during the data region or control information during the control region to a wireless node. In certain examples, aspects of the operations of block 1425 may be performed by a synchronization signal component as described with reference to FIGS. 7 and 8.

Figure 15:
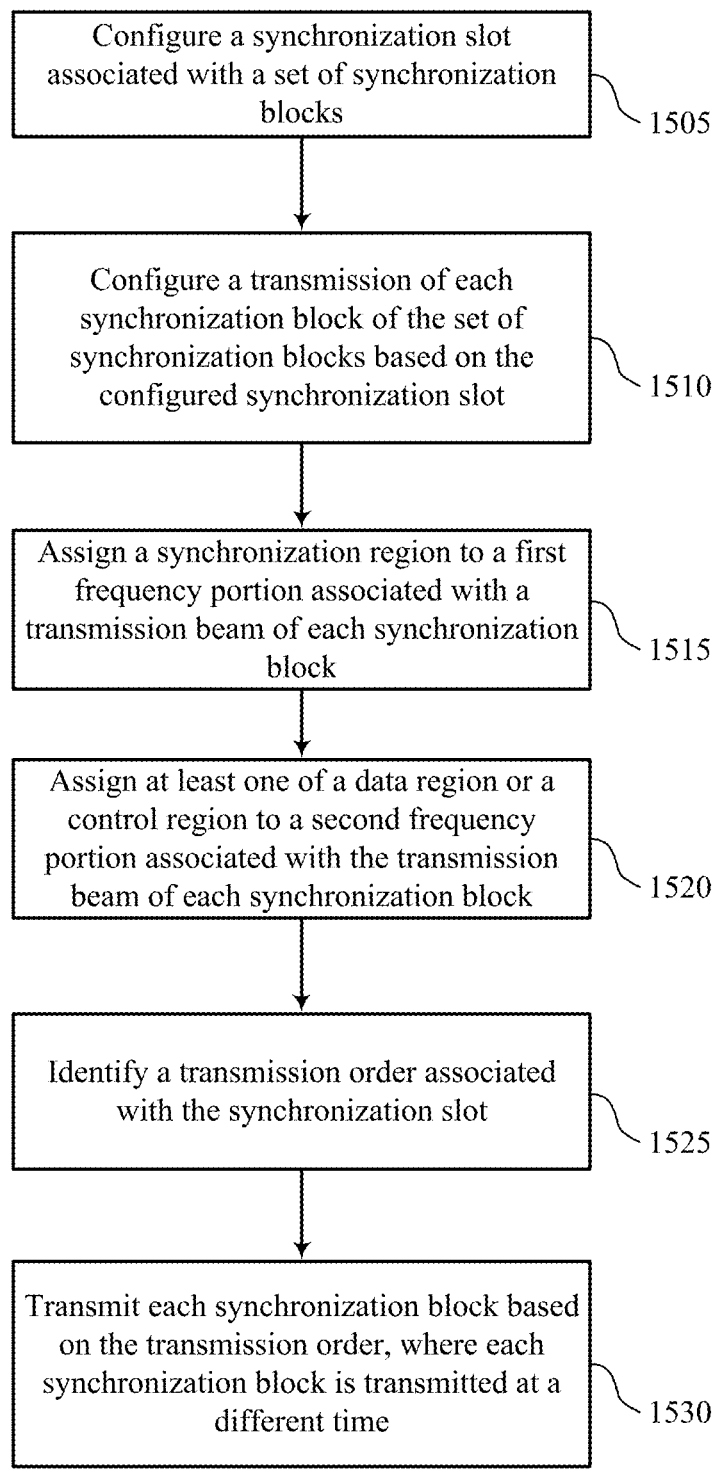

FIG. 15 illustrates a flowchart illustrating a method 1500 that supports data and control channels in synchronization bursts for mmW new radio, in accordance with various aspects of the present disclosure. The operations of method 1500 may be implemented by base station 105 or its components as described herein. For example, the operations of method 1500 may be performed by a base station synchronization manager as described with reference to FIGS. 6 through 9. In some examples, base station 105 may execute a set of codes to control the functional elements of the device to perform the functions described below. Additionally or alternatively, base station 105 may perform aspects the functions described below using special-purpose hardware.

At block 1505, base station 105 may configure a synchronization slot associated with a plurality of synchronization blocks. The operations of block 1505 may be performed according to the methods described with reference to FIG. 14. In certain examples, aspects of the operations of block 1505 may be performed by a synchronization slot component as described with reference to FIGS. 7 and 8.

At block 1510, base station 105 may configure a transmission of each synchronization block of the plurality of synchronization blocks based on the configured synchronization slot. The operations of block 1510 may be performed according to the methods described with reference to FIG. 14. In certain examples, aspects of the operations of block 1510 may be performed by a synchronization slot component as described with reference to FIGS. 7 and 8.

At block 1515, base station 105 may assign a synchronization region to a first frequency portion associated with a transmission beam of each synchronization block. The operations of block 1515 may be performed according to the methods described with reference to FIG. 14. In certain examples, aspects of the operations of block 1515 may be performed by a synchronization block component as described with reference to FIGS. 7 and 8.

At block 1520, base station 105 may assign at least one of a data region or a control region to a second frequency portion associated with the transmission beam of each synchronization block. The operations of block 1520 may be performed according to the methods described with reference to FIG. 14. In certain examples, aspects of the operations of block 1520 may be performed by a synchronization block component as described with reference to FIGS. 7 and 8.

At block 1525, base station 105 may identify a transmission order associated with the synchronization slot. The operations of block 1525 may be performed according to the methods described with reference to FIG. 14. In certain examples, aspects of the operations of block 1525 may be performed by a transmission order component as described with reference to FIG. 8.

At block 1530, base station 105 may transmit each synchronization block based on the transmission order, wherein each synchronization block may be transmitted at a different time. The operations of block 1530 may be performed according to the methods described with reference to FIGS. 14 through 17. In certain examples, aspects of the operations of block 1530 may be performed by a transmission order component as described with reference to FIG. 8.

Figure 16:
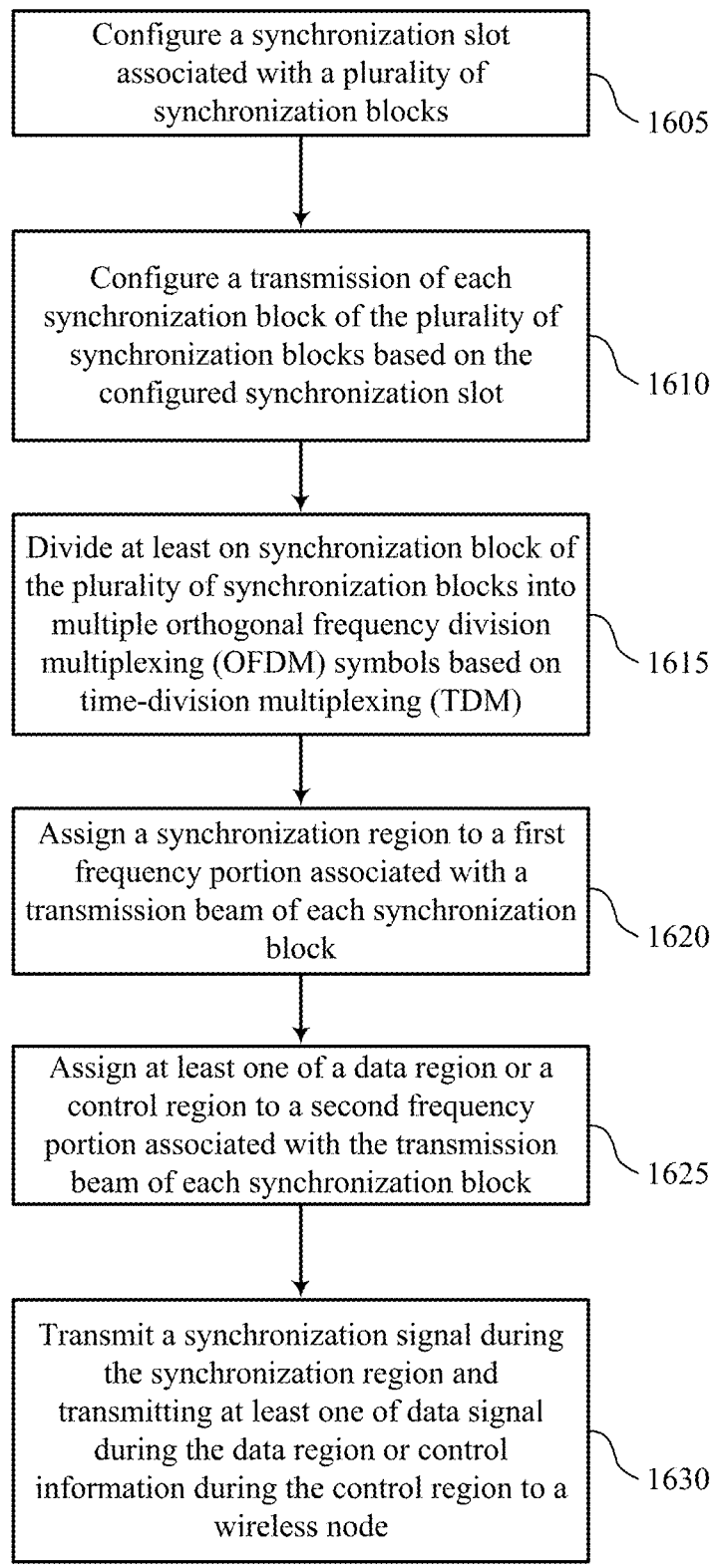

FIG. 16 illustrates a flowchart illustrating a method 1600 that supports data and control channels in synchronization bursts for mmW new radio, in accordance with various aspects of the present disclosure. The operations of method 1600 may be implemented by base station 105 or its components as described herein. For example, the operations of method 1600 may be performed by a base station synchronization manager as described with reference to FIGS. 6 through 9. In some examples, base station 105 may execute a set of codes to control the functional elements of the device to perform the functions described below. Additionally or alternatively, base station 105 may perform aspects the functions described below using special-purpose hardware.

At block 1605, base station 105 may configure a synchronization slot associated with a plurality of synchronization blocks. The operations of block 1605 may be performed according to the methods described with reference to FIGS. 14 and 15. In certain examples, aspects of the operations of block 1605 may be performed by a synchronization slot component as described with reference to FIGS. 7 and 8.

At block 1610, base station 105 may configure a transmission of each synchronization block of the plurality of synchronization blocks based on the configured synchronization slot. The operations of block 1610 may be performed according to the methods described with reference to FIGS. 14 and 15. In certain examples, aspects of the operations of block 1610 may be performed by a synchronization slot component as described with reference to FIGS. 7 and 8.

At block 1615, base station 105 may divide at least one synchronization block of the plurality of synchronization blocks into multiple OFDM symbols based on TDM. The operations of block 1615 may be performed according to the methods described with reference to FIGS. 14 and 15. In certain examples, aspects of the operations of block 1615 may be performed by a synchronization block diver component as described with reference to FIG. 8.

At block 1620, base station 105 may assign a synchronization region to a first frequency portion associated with a transmission beam of each synchronization block. The operations of block 1620 may be performed according to the methods described with reference to FIGS. 14 and 15. In certain examples, aspects of the operations of block 1620 may be performed by a synchronization block component as described with reference to FIGS. 7 and 8.

At block 1625, base station 105 may assign at least one of a data region or a control region to a second frequency portion associated with the transmission beam of each synchronization block. The operations of block 1625 may be performed according to the methods described with reference to FIGS. 14 and 15. In certain examples, aspects of the operations of block 1625 may be performed by a synchronization block component as described with reference to FIGS. 7 and 8.

At block 1630, base station 105 may transmit a synchronization signal during the synchronization region and transmitting at least one of data signal during the data region or control information during the control region to a wireless node. The operations of block 1630 may be performed according to the methods described with reference to FIGS. 14 and 15. In certain examples, aspects of the operations of block 1630 may be performed by a synchronization signal component as described with reference to FIGS. 7 and 8.

Figure 17:
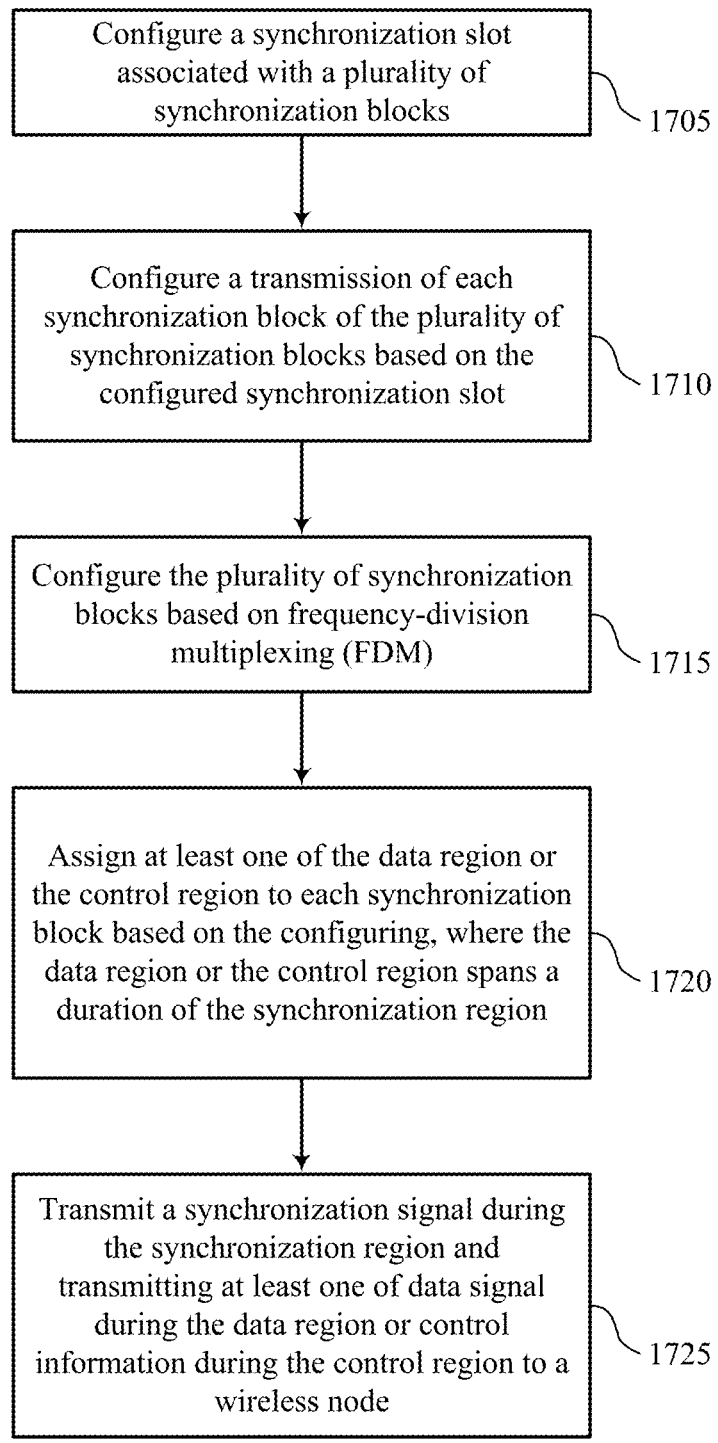

FIG. 17 illustrates a flowchart illustrating a method 1700 that supports data and control channels in synchronization bursts for mmW new radio, in accordance with various aspects of the present disclosure. The operations of method 1700 may be implemented by base station 105 or its components as described herein. For example, the operations of method 1700 may be performed by a base station synchronization manager as described with reference to FIGS. 6 through 9. In some examples, base station 105 may execute a set of codes to control the functional elements of the device to perform the functions described below. Additionally or alternatively, base station 105 may perform aspects the functions described below using special-purpose hardware.

At block 1705, base station 105 may configure a synchronization slot associated with a plurality of synchronization blocks. The operations of block 1705 may be performed according to the methods described with reference to FIGS. 14 through 16. In certain examples, aspects of the operations of block 1705 may be performed by a synchronization slot component as described with reference to FIGS. 7 and 8.

At block 1710, base station 105 may configure a transmission of each synchronization block of the plurality of synchronization blocks based on the configured synchronization slot. The operations of block 1710 may be performed according to the methods described with reference to FIGS. 14 through 46. In certain examples, aspects of the operations of block 1710 may be performed by a synchronization slot component as described with reference to FIGS. 7 and 8.

At block 1715, base station 105 may configure the plurality of synchronization blocks based on FDM. The operations of block 1715 may be performed according to the methods described with reference to FIGS. 14 through 16. In certain examples, aspects of the operations of block 1715 may be performed by a synchronization block component as described with reference to FIGS. 7 and 8.

At block 1720, base station 105 may assign at least one of the data region or the control region to each synchronization block based on the configuring, wherein the data region or the control region spans a duration of the synchronization region. The operations of block 1720 may be performed according to the methods described with reference to FIGS. 14 through 16. In certain examples, aspects of the operations of block 1720 may be performed by a synchronization block component as described with reference to FIGS. 7 and 8.

At block 1725, base station 105 may transmit a synchronization signal during the synchronization region and transmitting at least one of data signal during the data region or control information during the control region to a wireless node. The operations of block 1725 may be performed according to the methods described with reference to FIGS. 14 through 16. In certain examples, aspects of the operations of block 1725 may be performed by a synchronization signal component as described with reference to FIGS. 7 and 8.

Figure 18:
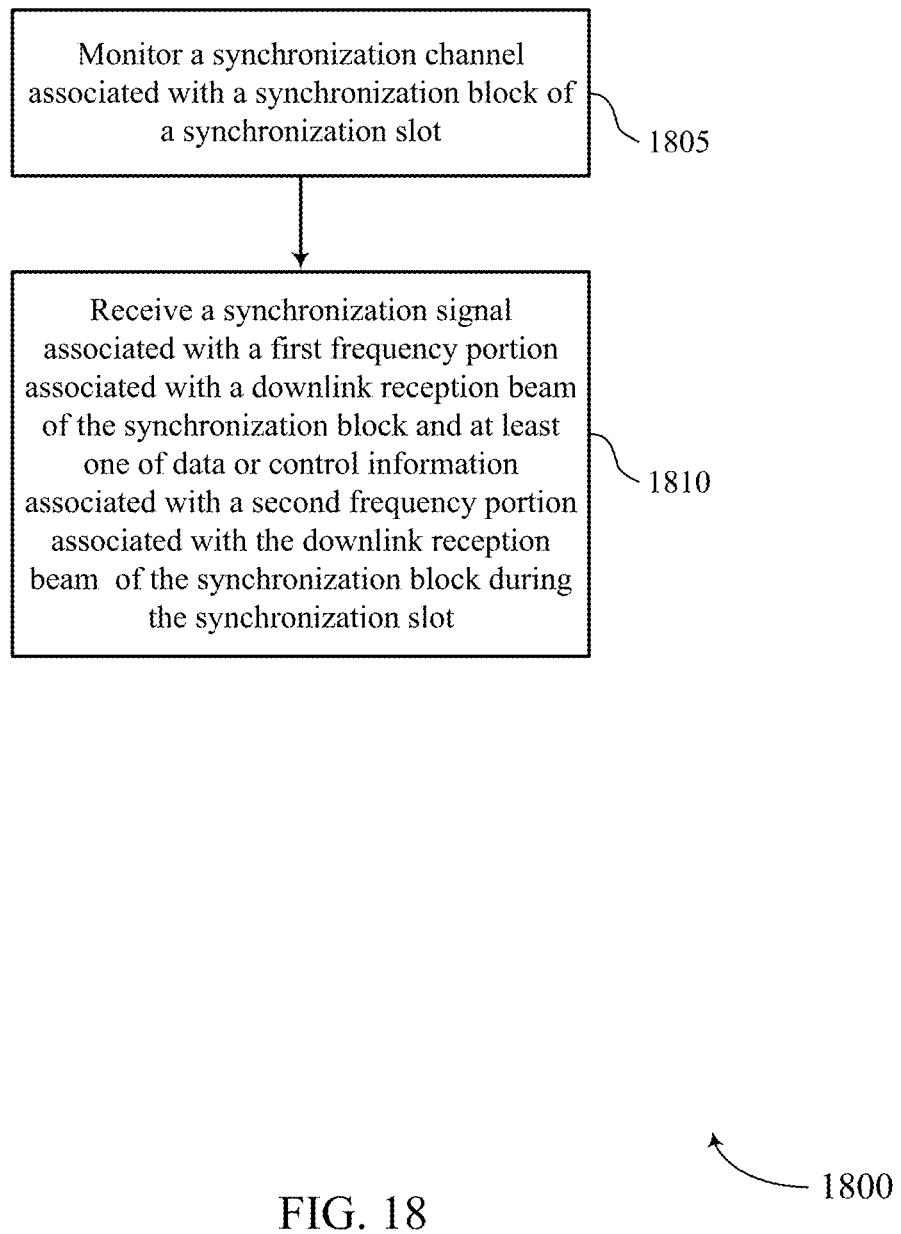

FIG. 18 illustrates a flowchart illustrating a method 1800 that supports data and control channels in synchronization bursts for mmW new radio, in accordance with various aspects of the present disclosure. The operations of method 1800 may be implemented by UE 115 or its components as described herein. For example, the operations of method 1800 may be performed by a UE synchronization manager as described with reference to FIGS. 10 through 13. In some examples, UE 115 may execute a set of codes to control the functional elements of the device to perform the functions described below. Additionally or alternatively, UE 115 may perform aspects the functions described below using special-purpose hardware.

At block 1805, UE 115 may monitor a synchronization channel associated with a synchronization block of a synchronization slot. In certain examples, aspects of the operations of block 1805 may be performed by a channel monitoring component as described with reference to FIGS. 11 and 12.

At block 1810, UE 115 may receive a synchronization signal associated with a first frequency portion associated with a downlink reception beam of the synchronization block and at least one of data or control information associated with a second frequency portion associated with the downlink reception beam of the synchronization block during the synchronization slot. In certain examples, aspects of the operations of block 1810 may be performed by a synchronization signal component as described with reference to FIGS. 11 and 12.

It should be noted that the methods described above describe possible implementations, and that the operations and the steps may be rearranged or otherwise modified and that other implementations are possible. Furthermore, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. The terms "system" and "network" are often used interchangeably. A code division multiple access (CDMA) system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A time division multiple access (TDMA) system may implement a radio technology such as Global System for Mobile Communications (GSM).

An orthogonal frequency division multiple access (OFDMA) system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications system (UMTS). 3GPP Long Term Evolution (LTE) and LTE-Advanced (LTE-A) are releases of Universal Mobile Telecommunications System (UMTS) that use E-UTRA. UTRA, E-UTRA, UMTS, LTE, LTE-A, NR, and Global System for Mobile communications (GSM) are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. While aspects an LTE or an NR system may be described for purposes of example, and LTE or NR terminology may be used in much of the description, the techniques described herein are applicable beyond LTE or NR applications.

In LTE/LTE-A networks, including such networks described herein, the term evolved node B (eNB) may be generally used to describe the base stations. The wireless communications system or systems described herein may include a heterogeneous LTE/LTE-A or NR network in which different types of evolved node B (eNBs) provide coverage for various geographical regions. For example, each eNB, gNB or base station may provide communication coverage for a macro cell, a small cell, or other types of cell. The term "cell" may be used to describe a base station, a carrier or component carrier associated with a base station, or a coverage area (e.g., sector, etc.) of a carrier or base station, depending on context.

Base stations may include or may be referred to by those skilled in the art as a base transceiver station, a radio base station, an access point, a radio transceiver, a NodeB, eNodeB (eNB), next generation NodeB (gNB), Home NodeB, a Home eNodeB, or some other suitable terminology. The geographic coverage area for a base station may be divided into sectors making up only a portion of the coverage area. The wireless communications system or systems described herein may include base stations of different types (e.g., macro or small cell base stations). The UEs described herein may be able to communicate with various types of base stations and network equipment including macro eNBs, small cell eNBs, gNBs, relay base stations, and the like. There may be overlapping geographic coverage areas for different technologies.

A macro cell generally covers a relatively large geographic area (e.g., several kilometers in radius) and may allow unrestricted access by UEs with service subscriptions with the network provider. A small cell is a lower-powered base station, as compared with a macro cell, that may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells (e.g., component carriers).

The wireless communications system or systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

The downlink transmissions described herein may also be called forward link transmissions while the uplink transmissions may also be called reverse link transmissions. Each communication link described herein—including, for example, wireless communication system 100 and 200 of FIGS. 1 and 2—may include one or more carriers, where each carrier may be a signal made up of multiple sub-carriers (e.g., waveform signals of different frequencies).

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may comprise RAM, ROM, electrically erasable programmable read only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, digital subscriber line (DSL), or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. An apparatus for wireless communication, in a system comprising:
    one or more processors;
    one or more memories in electronic communication with the one or more processors; and
    instructions stored in the one or more memories and operable, when executed by the one or more processors, to cause the apparatus to:
        monitor a synchronization channel associated with a beamformed synchronization block of a synchronization slot; and
        receive a synchronization signal associated with a first frequency portion associated with a downlink reception beam of the synchronization block and at least one of data or control information associated with a second frequency portion associated with the downlink reception beam of the synchronization block during the synchronization slot.

2. The apparatus of claim 1, wherein the instructions, when executed by the one or more processors, are further configured to cause the apparatus to:
    configure to detect at least one of the data or the control information associated with the synchronization block;
    determine an absence of at least one of the data or control information during the synchronization block; and
    transition into a micro-sleep state based at least in part on the absence.

3. The apparatus of claim 1, wherein the instructions, when executed by the one or more processors, are further configured to cause the apparatus to:
    transmit a random access channel (RACH) signal during a subframe of an uplink transmission beam.

4. The apparatus of claim 3, wherein the synchronization block is divided into multiple orthogonal frequency division multiplexing (OFDM) symbols based at least in part on time-division multiplexing (TDM).

5. The apparatus of claim 4, wherein the instructions, when executed by the one or more processors, are further configured to cause the apparatus to:
    receive the synchronization channel using the multiple OFDM symbols.

6. The apparatus of claim 1, wherein the synchronization block comprises a same orthogonal frequency division multiplexing (OFDM) symbol structure for a data region and a synchronization region, or for a control region and the synchronization region.

7. The apparatus of claim 1, wherein the synchronization block comprises a first orthogonal frequency division multiplexing (OFDM) symbol structure for a synchronization region and a second OFDM symbol structure for a data region or a control region, wherein the first OFDM symbol structure is different from the second OFDM symbol structure.

8. A method for wireless communication, comprising:
    monitoring a synchronization channel associated with a beamformed synchronization block of a synchronization slot; and
    receiving a synchronization signal associated with a first frequency portion associated with a downlink reception beam of the synchronization block and at least one of data or control information associated with a second frequency portion associated with the downlink reception beam of the synchronization block during the synchronization slot.

9. The method of claim 8, further comprising:
    configuring to detect at least one of the data or the control information associated with the synchronization block;
    determining an absence of at least one of the data or control information during the synchronization block; and
    transitioning into a micro-sleep state based at least in part on the absence.

10. The method of claim 8, further comprising:
    transmitting a random access channel (RACH) signal during a subframe of an uplink transmission beam.

11. The method of claim 8, wherein the synchronization block is divided into multiple orthogonal frequency division multiplexing (OFDM) symbols based at least in part on time-division multiplexing (TDM).

12. The method of claim 11, wherein the synchronization block is divided into multiple OFDM symbols based at least in part on the TDM, the method further comprising:
    receiving the synchronization channel using the multiple OFDM symbols.

13. The method of claim 12, wherein the synchronization channel comprises at least one of a physical broadcast channel (PBCH), or a primary synchronization signal (PSS), or a secondary synchronization signal (SSS), or a combination thereof.

14. The method of claim 8, wherein the synchronization block comprises a same orthogonal frequency division multiplexing (OFDM) symbol structure for a data region and a synchronization region, or for a control region and the synchronization region.

15. The method of claim 8, wherein the synchronization block comprises a first orthogonal frequency division multiplexing (OFDM) symbol structure for a synchronization region and a second OFDM symbol structure for a data region or a control region, wherein the first OFDM symbol structure is different from the second OFDM symbol structure.

16. A non-transitory computer-readable medium storing code for wireless communication, the code comprising instructions executable by one or more processors to:
    monitor a synchronization channel associated with a beamformed synchronization block of a synchronization slot; and receive a synchronization signal associated with a first frequency portion associated with a downlink reception beam of the synchronization block and at least one of data or control information associated with a second frequency portion associated with the downlink reception beam of the synchronization block during the synchronization slot.

17. The non-transitory computer-readable medium of claim 16, wherein the synchronization block is divided into multiple orthogonal frequency division multiplexing (OFDM) symbols based at least in part on time-division multiplexing (TDM).

18. The non-transitory computer-readable medium of claim 17, the code further comprising instructions executable by the one or more processors to:

receive the synchronization channel using the multiple OFDM symbols.

19. The non-transitory computer-readable medium of claim 16, wherein the synchronization block comprises a same orthogonal frequency division multiplexing (OFDM) symbol structure for a data region and a synchronization region, or for a control region and the synchronization region.

20. The non-transitory computer-readable medium of claim 16, wherein the synchronization block comprises a first orthogonal frequency division multiplexing (OFDM) symbol structure for a synchronization region and a second OFDM symbol structure for a data region or a control region, wherein the first OFDM symbol structure is different from the second OFDM symbol structure.

\* \* \* \* \*